(12) United States Patent
Nakamura et al.

(10) Patent No.: US 11,484,787 B2
(45) Date of Patent: Nov. 1, 2022

(54) RECORDING MEDIUM, SCREEN OUTPUT METHOD, SCREEN GENERATION METHOD, INFORMATION PROCESSING APPARATUS, AND MONITORING SYSTEM OF MULTI REFEREE SCORING WITH TIMELINE DISPLAY

(71) Applicant: FUJITSU LIMITED, Kawasaki (JP)

(72) Inventors: Kouji Nakamura, Ota (JP); Hiroyuki Sumida, Yokohama (JP); Tomohiro Takada, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 94 days.

(21) Appl. No.: 17/074,721

(22) Filed: Oct. 20, 2020

(65) Prior Publication Data
US 2021/0146242 A1    May 20, 2021

(30) Foreign Application Priority Data
Nov. 19, 2019  (JP) .............................. JP2019-209189

(51) Int. Cl.
*A63F 13/46*    (2014.01)
*G06F 3/01*    (2006.01)
(Continued)

(52) U.S. Cl.
CPC .............. *A63F 13/46* (2014.09); *G06F 3/011* (2013.01); *G06F 3/14* (2013.01); *G06T 11/00* (2013.01)

(58) Field of Classification Search
CPC ................................ A63B 71/06; A63F 13/46
See application file for complete search history.

(56) References Cited

U.S. PATENT DOCUMENTS 3,737,889 A    6/1973  Sweeny

FOREIGN PATENT DOCUMENTS

| JP | S47-031731 | 11/1972 |
| JP | S51-23210 B1 | 7/1976 |
| JP | 2011-104192 A | 6/2011 |

OTHER PUBLICATIONS

"Boxing Scoring System 2013 Hardware Components User Manual", [dated 2013], [online], [retrieved Mar. 21, 2022], [Retrieved from the internet <URL: https://manualzz.com/doc/6664514/boxing-scoring-system-2013>. 15 pages.*

(Continued)

*Primary Examiner* — Lawrence S Galka
(74) *Attorney, Agent, or Firm* — Fujitsu Patent Center

(57) ABSTRACT

A method for causing a computer to execute a process, the process includes receiving an input operation from each of a plurality of referees in a match of a competitive game; specifying, based on the input operation, a referee who performs an input, a first input or a second input, and a plurality of players in the match; generating a first image including middle areas and small areas, the middle areas being assigned for each player of the plurality of players, the small areas being assigned to each of the plurality of referees for each of the middle areas and being provided to be arranged along a timeline indicating a progress of the match; and adding, in the first image, an index indicating the first input or the second input to a position determined by the specified player, the specified referee, and a timing related to the input operation.

13 Claims, 27 Drawing Sheets

(51) Int. Cl.
*G06T 11/00* (2006.01)
*G06F 3/14* (2006.01)

(56) References Cited

OTHER PUBLICATIONS

"Boxing Scoring System 2013 User Manual for WinBPM 3.0", [dated 2017], [online], [retrieved Mar. 21, 2022], [Retrieved from the internet <URL:https://www.swisstiming.com/fileadmin/Resources/Software_updates/BSS2013_Software_Manual.pdf>. 11 pages.*
Swiss Timing LTD, "Boxing Scoring System" (Total 2 pages) nttp://www.swisstiming.com/fileadmin/Resources/Data/Datasheets/DOCM_BX_ScoringSystem_121 5_EN.pdf.

* cited by examiner

FIG. 3

| PIN NUMBER | SIGNAL |
|---|---|
| PIN1 | a |
| PIN2 | b |
| ... | ... |
| PIN20 | ... |

FIG. 4

| ITEM NUMBER | SIGNAL | OUTPUT POSITION | DISPLAY COLOR |
|---|---|---|---|
| 1 | a | DISPLAY LINE 1 | RED |
| 2 | b | DISPLAY LINE 1 | YELLOW |
| 3 | c | DISPLAY LINE 6 | BLUE |
| 4 | d | DISPLAY LINE 6 | YELLOW |
| ... | ... | ... | ... |
| 11 | k | DISPLAY LINE 8 | BLUE |
| 12 | l | DISPLAY LINE 8 | YELLOW |
| ... | ... | ... | ... |

FIG. 5

| ROUND | SECOND | NORMAL ATTACK | | | | | | | | | | STRONG ATTACK | | | | | | | | | |
|---|---|---|---|---|---|---|---|---|---|---|---|---|---|---|---|---|---|---|---|---|---|
| | | RED CORNER | | | | | BLUE CORNER | | | | | RED CORNER | | | | | BLUE CORNER | | | | |
| | | REFEREE A | REFEREE B | REFEREE C | REFEREE D | REFEREE E | REFEREE A | REFEREE B | REFEREE C | REFEREE D | REFEREE E | REFEREE A | REFEREE B | REFEREE C | REFEREE D | REFEREE E | REFEREE A | REFEREE B | REFEREE C | REFEREE D | REFEREE E |
| 1 | 1 | 0 | 0 | 0 | 0 | 2 | ... | ... | ... | ... | ... | 0 | 0 | 1 | 0 | 0 | ... | ... | ... | ... | ... |
| | ... | | | | | | | | | | | | | | | | | | | | |
| | 190 | | | | | | | | | | | | | | | | | | | | |
| 2 | | ... | | | | | ... | | | | | ... | | | | | ... | | | | |
| 3 | | ... | | | | | ... | | | | | ... | | | | | ... | | | | |

FIG. 11
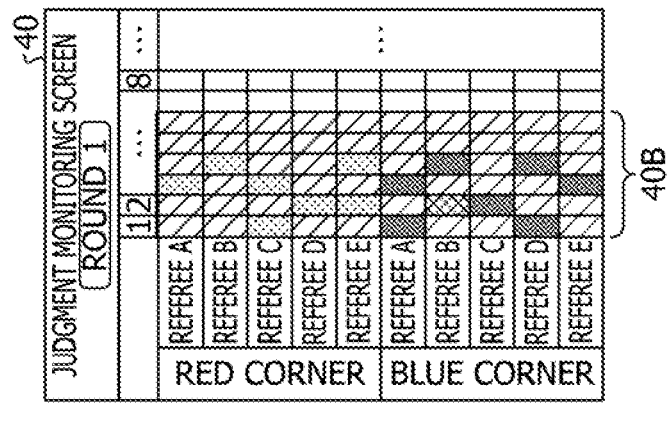
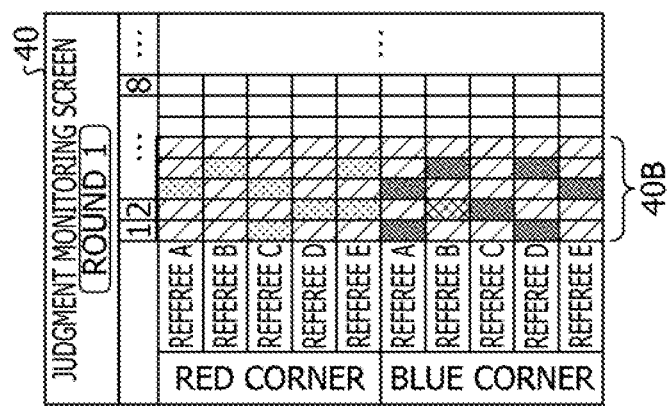
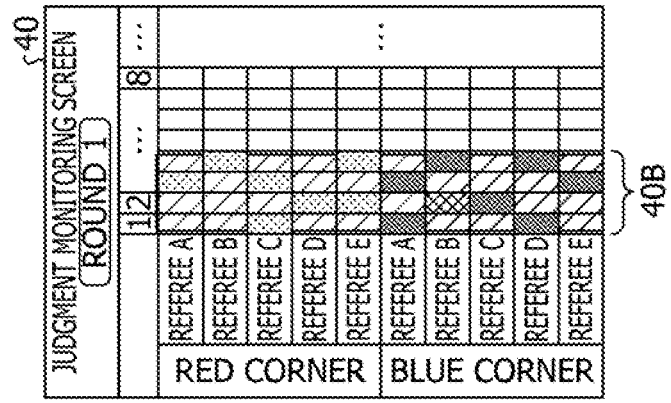

FIG. 12

RECORDING MEDIUM, SCREEN OUTPUT METHOD, SCREEN GENERATION METHOD, INFORMATION PROCESSING APPARATUS, AND MONITORING SYSTEM OF MULTI REFEREE SCORING WITH TIMELINE DISPLAY

CROSS-REFERENCE TO RELATED APPLICATION

This application is based upon and claims the benefit of priority of the prior Japanese Patent Application No. 2019-209189, filed on Nov. 19, 2019, the entire contents of which are incorporated herein by reference.

FIELD

The embodiments discussed herein are related to a computer-readable recording medium having stored therein a screen output program, a screen output method, an information processing apparatus, a computer-readable recording medium having stored therein a screen generation program, a screen generation method, and a monitoring system.

BACKGROUND

Win or loss of a match in a competitive game is often determined by counting effective points such as effective attacks and defenses by a plurality of referees and using the counting result of each referee. For example, in boxing, a counting system, which counts the final number of effective attacks of each player at the end of each round when a player A and a player B make effective attacks against each other during a match and a referee pushes a counter, is used. In recent boxing, a scoring system, in which each referee scores 10 points for a dominant player and scores points lower than 10 points for the other player at the end of each round using an input device at hand, is used. For example, Japanese Laid-open Patent Publication No. 2011-104192, "BOXING SCORING SYSTEM", <http://www.swisstming.com/fileadmin/Resources/Data/Datasheets/DOCM_BX_ScoringSystem_1215_EN.pdf>, Swiss Timing LTD, and the like are disclosed.

SUMMARY

According to an aspect of the embodiments, a computer-readable recording medium having stored therein a screen output program for causing a computer to execute a process, the process includes receiving an input operation from each of a plurality of referees in a match of a competitive game; specifying, based on the input operation, a referee who performs an input, a first input or a second input, and a plurality of players in the match; generating a first image including middle areas and small areas, the middle areas being assigned for each player of the plurality of players, the small areas being assigned to each of the plurality of referees for each of the middle areas and being provided to be arranged along a timeline indicating a progress of the match; adding, in the first image, an index indicating the first input or the second input to a position determined by the specified player, the specified referee, and a timing related to the input operation; and outputting a second image in which the index is added in the first image.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a diagram explaining an example of conversion information;

FIG. 4 is a diagram explaining an example of output conversion information;

FIG. 5 is a diagram explaining an example of collection result;

FIG. 11 is a diagram explaining a progress display example of the judgment monitoring screen;

FIG. 12 is a diagram explaining an example of generation of a judgment monitoring screen based on a collection result;

DESCRIPTION OF EMBODIMENTS

However, in the above-described technique, although the points of each player are determined by a subjective evaluation of each referee, it is difficult to understand a reason why the referee scores the points, and as a result there is a case where a determination result is incorrect or unfair.

For example, in the counting system, such as "5 points" for a player A and "8 points" for a player B, a final result of the number of times each player performs effective attacks in the round is viewed, and as a result, it is difficult to confirm a timing at which the referee determines the effective attacks. Similarly in the scoring system, since a dominant player is known after the end of the round, it is difficult to confirm a timing at which and a reason why the referee determines that the player is dominant.

As described above, in the system, since transparency in scoring is not ensured, it is difficult to confirm a biased determination of a certain referee on a certain player. As a result, there is a case where a determination result is incorrect or unfair.

In consideration of the above circumstances, it is desired to confirm whether determination of a referee is not biased.

Hereinafter, embodiments of a screen output program, a screen output method, an information processing apparatus, a screen generation program, a screen generation method, and a monitoring system disclosed in this application will be described in detail with reference to the drawings. The present disclosure is not limited to the embodiments. The embodiments may be combined with each other as appropriate within a technical scope without contradiction.

Embodiment 1

[Overall Configuration]

Figure 1:
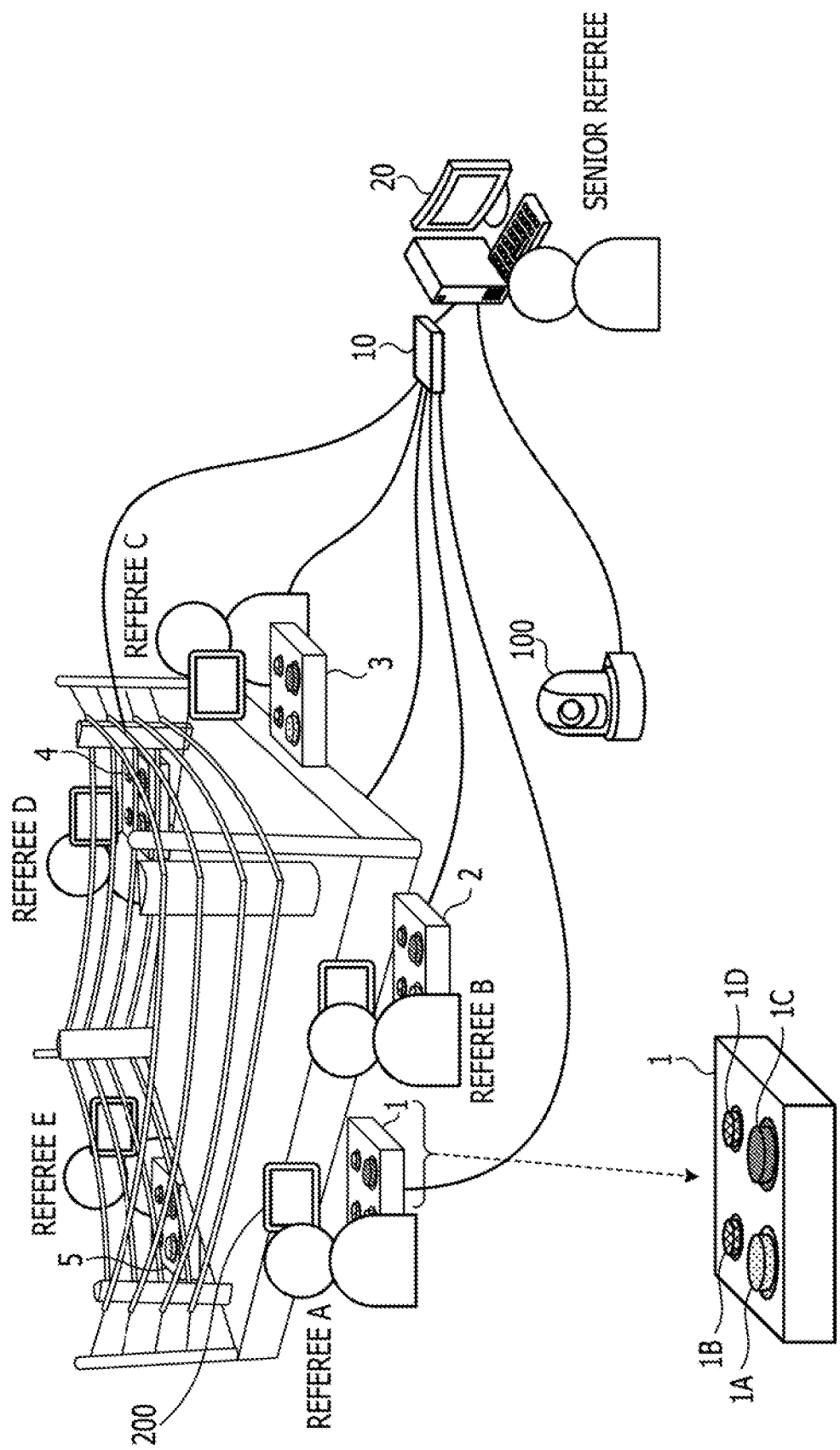
FIG. 1 is a diagram explaining an example of an overall configuration of a judgment monitoring system according to Embodiment 1.

FIG. 1 is a diagram explaining an example of an overall configuration of a judgment monitoring system according to Embodiment 1. As illustrated in FIG. 1, in Embodiment 1, by taking an example of boxing which is an example of a competitive game, an example in which a senior referee monitors five referees (hereinafter, simply referred to as "referees" in some cases) and a refereeing process by the five referees using a monitoring screen will be described.

As illustrated in FIG. 1, a judgment monitoring system includes input devices 1 to 5, a relay device 10, a video camera 100, a tablet terminal 200, and a monitor device 20. The devices are coupled to each other via a network, and the network may be any of various wired or wireless networks.

As an example of each of the input devices 1, 2, 3, 4, and 5, an input pad provided in each seat of referees A, B, C, D, and E may be used. The relay device 10 is a switch or the like that couples each input device and the monitor device 20. The video camera 100 captures a moving image or a still image of a boxing match by capturing an image of the entire ring from the start to the end of the boxing match. The tablet terminal 200 is an example of a computer device used by each referee. The monitor device 20 is an example of a computer device used by the senior referee who monitors a determination result of each referee.

In many cases, for scoring in boxing, a scoring system, in which each referee scores 10 points for a dominant player and scores points lower than points for the other player at the end of each round (Ten-point Mast system), is used.

In a 10-point mast system, in a case of boxing, for each round, a dominant player is determined at the end of each round, and the dominant player scores 10 points. At this time, as a basis of the point scoring, for example, in attacks and defenses between players, when an effective attack is determined, when there is a defense for defending a player himself/herself against an effective attack, and when a certain player is dominant at each time in a match progress, effective determinations (points) are scored. On the other hand, the effective determinations are determined by subjectivity of each referee, and only scores (10-9, 10-8, and the like), which are final determination results of each referee, are input to the scoring system. As a result, it is difficult to confirm a biased determination of a certain referee on a certain player during or after a match. In addition, each referee is able to recognize only a timing at which the referee himself/herself performs an effective determination, and as a result, each referee is not able to look back on his/her determination by comparing the determination of the referee himself/herself with determinations of other referees. Thus, it is also difficult to improve a scoring skill of each referee.

For this reason, in a case where a timing at which each referee performs point addition as an effective determination is displayed to each referee and spectators during a match, after the end of a round, or after the end of a match, transparency in scoring is ensured. Thus, validity of determination of each referee is ensured, a scoring skill of each referee is improved, and the value of the match itself is improved.

Therefore, in Embodiment 1, the monitor device 20 collects a timing at which each referee performs an effective determination, and displays and outputs the timing to the senior referee according to a situation such as in real time or at the time of receiving a request. Thereby, there is provided an interface capable of ensuring transparency in scoring and allowing the senior referee to compare and examine whether determination of each referee is not biased.

For example, each referee presses a corresponding button of the input device at hand when an effective attack is performed. For example, the input device 1 includes a red button 1A, a yellow button 1B, a blue button 1C, and a yellow button 1D. The red button 1A and the yellow button 1B are buttons associated with a player in a red corner. The button 1A is associated with a normal attack which is an effective attack such as a jab, and the button 1B is associated with a strong attack which is a strong and effective attack leading to a down of the opponent player. Similarly, the blue button 1C and the yellow button 1D are buttons associated with a player in a blue corner. The button 1C is associated with a normal attack, and the button 1D is associated with a strong attack. In the following Embodiment, an example of a combination of an input indicating a normal attack as a first input and an input indicating a strong attack as a second input will be described. In addition to this combination, a combination of an input indicating an attack as a first input and an input indicating a defense as a second input may be used. The first input and the second input are inputs for each of a plurality of factors that may be bases of a final scoring result by the referee. For example, a first factor is a strong attack, and a second factor is a normal attack.

For example, the referee A presses the button 1A when counting a normal attack of a player X in the red corner, and presses the button 1D when counting a strong attack of a player Y in the blue corner. Similarly, the referee A presses the button 1B when counting a strong attack of the player X in the red corner, and presses the button 1C when counting a normal attack of the player Y in the blue corner.

The monitor device 20 used by the senior referee acquires a pressing result of the button from each input device via the relay device 10, and displays a button pressing state of each referee, for example, a state of an effective determination in real time.

For example, the monitor device 20 generates a judgment monitoring screen 40 (illustrated in FIG. 6 to be described) including areas obtained by arranging small areas assigned to each referee in each of middle areas assigned to each player and dividing the small areas of each referee along a timeline. When the referee A presses the red button 1A at a time t, the monitor device 20 displays, in red, the area corresponding to the time t among the small area of the referee A in the middle area assigned to the player X in the red corner. When the referee C presses the yellow button 1D at a time t+1, the monitor device 20 displays, in yellow, the area corresponding to the time t+1 among the small area of the referee C in the middle area assigned to the player Y in the blue corner. In each of the middle areas, the arrangement order of the small areas assigned to each referee is the same. For example, in a case where the small areas of the referees A, B, C, D, and E are arranged in this order in the middle area for the player X, the small areas of the referees A, B, C, D, and E are arranged in this order in the middle area for the player Y.

In this way, the monitor device 20 provides an interface that allows the senior referee to compare and examine determination states of each referee by collecting, in real time, timings at which each referee performs an effective determination and displays the timings in real time.

[Functional Configuration]

Figure 2:
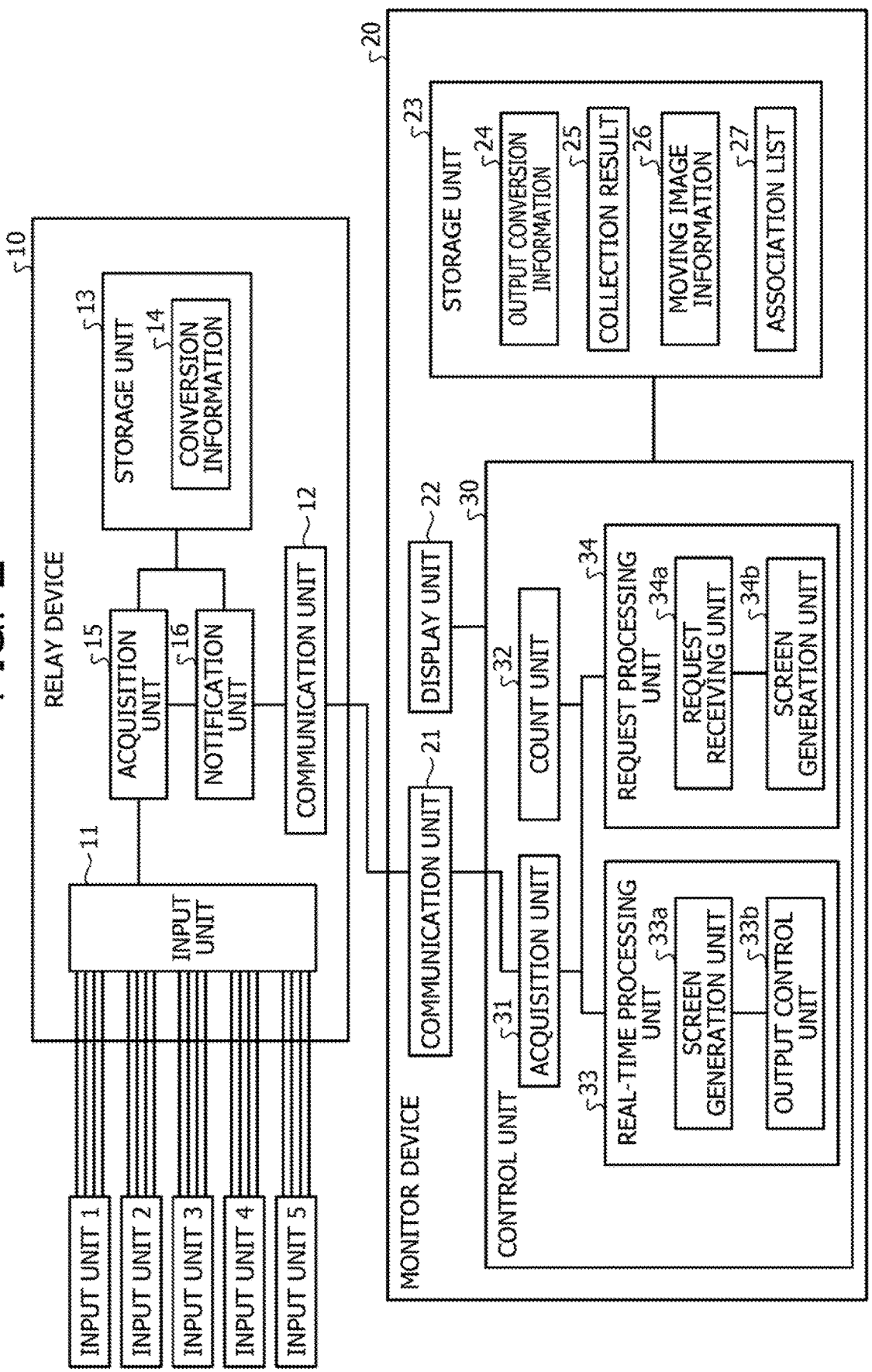
FIG. 2 is a functional block diagram illustrating a functional configuration of the judgment monitoring system according to Embodiment 1.

Next, a functional configuration of each device of the judgment monitoring system will be described. FIG. 2 is a functional block diagram illustrating a functional configuration of a judgment monitoring system according to Embodiment 1. Although the tablet terminal 200 is not illustrated in FIG. 2, as the tablet terminal 200, a computer device including a touch panel and the like may be used.

(Functional Configuration of Relay Device 10)

As illustrated in FIG. 2, the relay device 10 includes an input unit 11, a communication unit 12, a storage unit 13, an acquisition unit 15, and a notification unit 16. The relay device 10 is an example of a computer device that notifies the monitor device 20 of a refereeing process performed by each referee using each input device. The acquisition unit 15 and the notification unit 16 may be configured by a hardware circuit or an electronic circuit included in a processor, or may be configured as a process executed by the processor.

The input unit 11 is a processing unit coupled to each of the input devices 1 to 5 used by the referees, and is, for example, an input device including a plurality of input/output ports (PINs). For example, the input unit 11 is coupled to the input device 1 using PIN1 to PIN4, is coupled to the input device 2 using PIN5 to PIN8, is coupled to the input device 3 using PIN9 to PIN12, is coupled to the input device 4 using PIN13 to PIN16, and is coupled to the input device 5 using PIN17 to PIN20. Each PIN is coupled to each button of each input device.

Here, each input device will be described. Each input device includes four buttons in which a display color for display by the monitor device is set. For example, each input device includes a red button A that is pressed at the time of a normal attack of the player in the red corner, a yellow button B that is pressed at the time of a strong attack of the player in the red corner, a blue button C that is pressed at the time of a normal attack of the player in the blue corner, and a yellow button D that is pressed at the time of a strong attack of the player in the blue corner. Since each button is coupled to the input/output ports of the input unit 11 of the relay device 10, the relay device is able to specify which button of which input device is pressed.

Returning to FIG. 2, the communication unit 12 is a processing unit that controls communication with other devices such as the monitor device 20, and is, for example, a communication interface or the like. For example, the communication unit 12 transmits a signal corresponding to an input from each input device to the monitor device 20.

The storage unit 13 is an example of a storage device that stores programs and data, and is, for example, a memory, a hard disk, or the like. For example, the storage unit 13 stores conversion information 14.

The conversion information 14 is information used to convert an input from each input device into a signal to be transmitted to the monitor device 20. An output signal obtained by converting an input from the input device is information for identifying the referee who performs the input, the first input indicating a normal attack or the second input indicating a strong attack, and one player of a plurality of players in the match.

Figure 3:
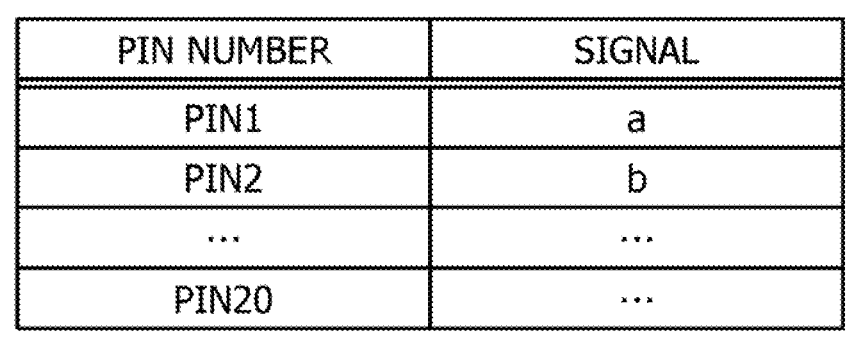

FIG. 3 is a diagram explaining an example of the conversion information 14. As illustrated in FIG. 3, the conversion information 14 is information in which a "PIN number" and a "signal" are associated with each other. The stored "PIN number" indicates an input/output port, and the stored "signal" is information for specifying a signal to be transmitted to the monitor device 20. The example of FIG. 3 indicates that, in a case where an input signal is received via the PIN1 coupled to the button 1A of the input device 1, the input signal is converted into a signal "a", and in a case where an input signal is received via the PIN2 coupled to the button 1B of the input device 1, the input signal is converted into a signal "b".

The acquisition unit 15 is a processing unit that acquires an input signal from the input device via the input unit 11. For example, when receiving an input signal via each PIN, the acquisition unit 15 outputs a PIN number through which the input signal is received, to the notification unit 16.

The notification unit 16 is a processing unit that transmits an output signal corresponding to the input signal to the monitor device 20. For example, the notification unit 16 converts the input signal, which is input to the input unit 11, into an output signal according to the conversion information 14, and transmits the output signal. For example, when PIN1 is notified from the acquisition unit 15, the notification unit 16 specifies the signal a according to the conversion information 14, and transmits the signal a to the monitor device 20.

(Functional Configuration of Monitor Device 20)

As illustrated in FIG. 2, the monitor device 20 includes a communication unit 21, a display unit 22, a storage unit 23, and a control unit 30. The monitor device 20 is an example of a computer device that generates a judgment monitoring screen 40 and displays and outputs, in real time, a result of determination by each referee, as a normal attack or a strong attack of each of the player X (red corner) and the player Y (blue corner).

The communication unit 21 is a processing unit coupled to a device such as the relay device 10, and is, for example, a communication interface. For example, the communication unit 21 receives the signal a and the like from the relay device 10. The communication unit 21 may receive moving image information captured by the video camera 100. The communication unit 21 is able to transmit various types of information such as a screen generated by the control unit 30, to an external device.

The display unit 22 is a processing unit that displays various types of information, and is, for example, a display, a monitor, a touch panel, or the like. For example, the display unit 22 displays various types of information such as a screen generated by the control unit 30.

The storage unit 23 is an example of a storage device that stores data and a program to be executed by the control unit 30, and is, for example, a memory or a hard disk. The storage unit 23 stores output conversion information 24, a collection result 25, moving image information 26, and an association list 27.

The output conversion information 24 is information for converting information relayed from the relay device 10 into information to be output to the judgment monitoring screen 40. FIG. 4 is a diagram explaining an example of the output conversion information 24. As illustrated in FIG. 4, the output conversion information 24 stores "item number", "signal", "output position", and "display color" in association with each other. In the present embodiment, the referee who performs the input and one player of the plurality of players in the match are specified by the output position. Whether the input is the first input indicating a normal attack or the second input indicating a strong attack is specified by the display color.

The stored "item number" is an identifier for identifying each piece of information, and the "signal" indicates a signal input from the relay device 10. The "output position" indicates a position over the judgment monitoring screen 40, and the "display color" Indicates a color displayed on the judgment monitoring screen 40. In FIG. 4, the item number 1 indicates that the signal a input from the relay device 10 is displayed in red on a display line 1 of the judgment monitoring screen 40. The item number 2 indicates that the signal b input from the relay device 10 is displayed in yellow on the display line 1 of the judgment monitoring screen 40. Details of the output position will be described later. The output conversion information 24 is information defined in advance by a user.

The collection result 25 is a result input from the relay device 10. For example, the collection result 25 is a list of the determination results of the referees. The stored information is generated by the control unit 30. FIG. 5 is a diagram explaining an example of the collection result 25. As illustrated in FIG. 5, the collection result 25 stores the number of times each referee determines a normal attack and the number of times each referee determines a strong attack, for each player in the red corner and the blue corner, for each timeline (each second) of each round.

In the example of FIG. 5, in a timeline 1 (1 second) immediately after a first round (hereinafter, simply referred to as "round 1" in some cases) is started, for normal attacks of the red corner, the number of times of counts of the referee A is 0, the number of times of counts of the referee B is 0, the number of times of counts of the referee C is 0, the number of times of counts of the referee D is 0, and the number of times of counts of the referee E is 2. In the timeline 1 (1 second) immediately after the round 1 is started, only the referee C counts a strong attack of the red corner one time. The timeline is set to be slightly longer than a match time in order to allow an error. For example, in a case where one round is 3 minutes, the timeline is set to 190 seconds (180 seconds+α) longer than 3 minutes (180 seconds). α is a certain numerical value.

The moving image information 26 is a match video captured by the video camera 100. The moving image information 26 is managed by the same time stamp as a time stamp of the collection result.

The association list 27 is information for identifying which referee counts which attack of which player from the signal. For example, the association list 27 is information in which a signal, an attack type, and a referee are associated with each other. More specifically, the association list 27 includes, as "signal, corner, attack type, referee", "signal a, red corner, normal attack, referee A", "signal b, red corner, strong attack, referee A", "signal c, blue corner, normal attack, referee A", "signal d, blue corner, strong attack, referee A", and the like.

The control unit 30 is a processing unit that manages the entire monitor device 20, and is, for example, a processor or the like. The control unit includes an acquisition unit 31, a count unit 32, a real-time processing unit 33, and a request processing unit 34. The acquisition unit 31, the count unit 32, the real-time processing unit 33, and the request processing unit 34 are examples of electronic circuits included in the processor or examples of processes executed by the processor.

The acquisition unit 31 is a processing unit that receives a signal from the relay device 10 via the communication unit 21. For example, each time a button of each input device is pressed, the acquisition unit 31 receives a signal corresponding to the pressed button via the relay device 10. The acquisition unit 31 outputs the received signal to the count unit 32, the real-time processing unit 33, and the request processing unit 34. The signal is information for identifying the referee who performs the input, the first input indicating a normal attack or the second input indicating a strong attack, and one player of the plurality of players in the match. A signal indicating the referee who performs the input, a signal indicating whether the input is the first input indicating a normal attack or the second input indicating a strong attack, and a signal indicating one player of the plurality of players in the match may be individually acquired.

The count unit 32 is a processing unit that counts each signal based on the acquisition result acquired by the acquisition unit 31. For example, the count unit 32 generates a collection result by collecting the determination results of the referees.

For example, when the signal a is input from the acquisition unit 31 at a timing of the timeline 1 of the round 1 (1 second after the start of the match), the count unit 32 specifies that the referee A counts a normal attack of the player in the red corner by referring to the association list 27. The count unit 32 increments the count number of the normal attacks of the referee A for the red corner at the timeline 1 (1 second) of the round 1 in the collection result 25.

The real-time processing unit 33 includes a screen generation unit 33a and an output control unit 33b, and is a processing unit that generates a judgment monitoring screen 40 based on the determination results of the referees and outputs the judgment monitoring screen 40 to the display unit 22 in real time.

Figure 6:
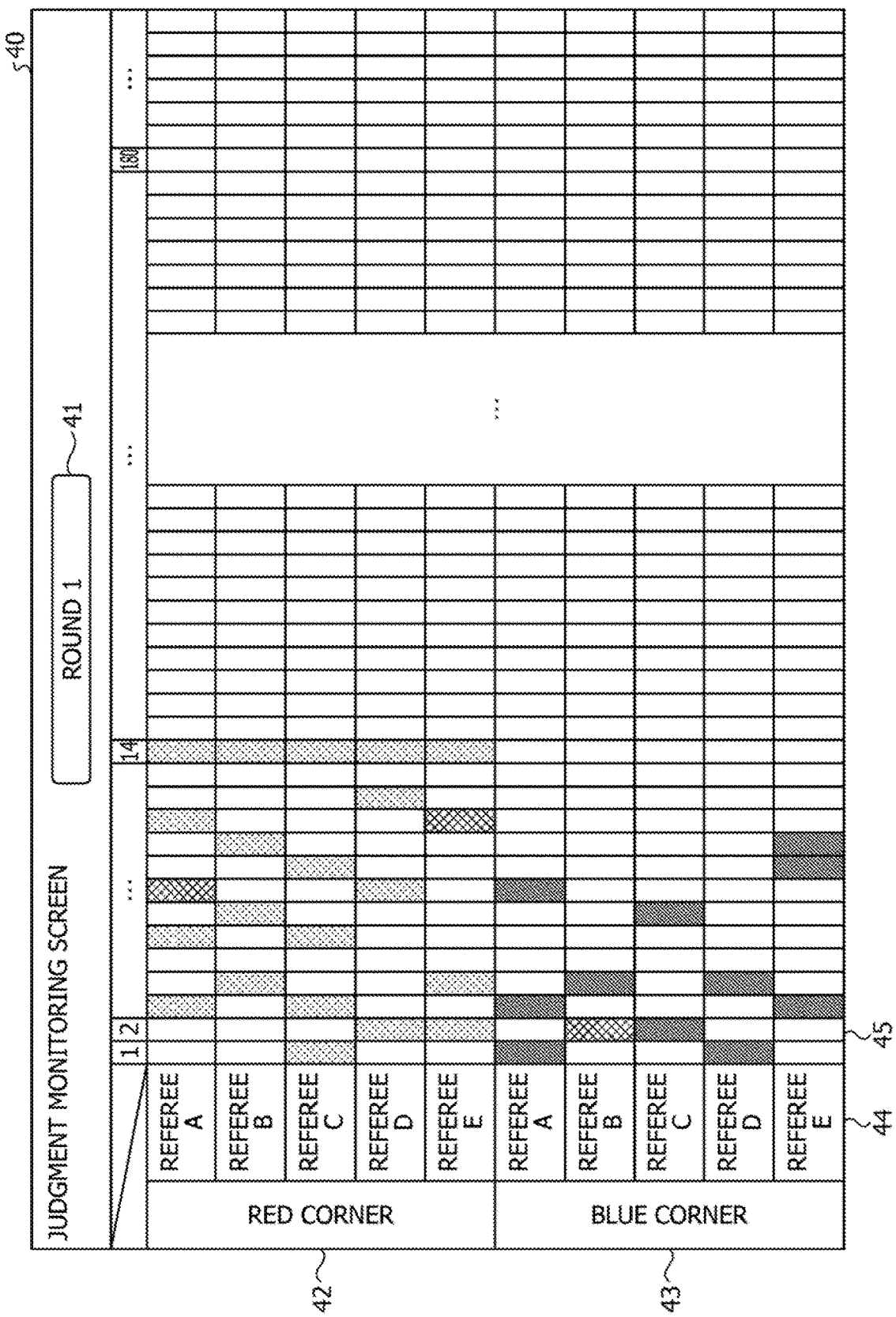
FIG. 6 is a diagram explaining an example of a judgment monitoring screen.

The screen generation unit 33a is a processing unit that generates the judgment monitoring screen 40. Here, details of the judgment monitoring screen 40 generated by the screen generation unit 33a will be described. FIG. 6 is a diagram explaining an example of the judgment monitoring screen 40. As illustrated in FIG. 6, the screen generation unit 33a generates the judgment monitoring screen 40 including an area 41 for displaying information specifying the current round, a middle area 42 for displaying a determination result for a player in the red corner, and a middle area 43 for displaying a determination result for a player in the blue corner.

The screen generation unit 33a generates small areas 44 assigned to the referees A to E in each of the middle area 42 and the middle area 43. The screen generation unit 33a generates scales 45 (timelines) indicating a time width from the start timing to the end timing of the match in the small area 44 of each referee. Here, in the scale 45, 190 seconds, which are obtained by adding, for example, 10 seconds as a predetermined time length to 180 seconds (3 minutes) corresponding to a time length of one round, are divided every 1 second. In the following description, each interval divided every 1 second on the timeline is referred to as a time cell. For example, the determination result at the 1 second after the start of the round 1 corresponds to a first line (timeline 1) of the scale 45, and the determination result at the 2 seconds of the round 1 corresponds to a second line (timeline 2) of the scale 45. The time length, which is added to the time length of one round to set the timeline, may be appropriately changed by a system designer.

Here, the screen generation unit 33a generates a screen in which the arrangement order of the small areas 44 displayed in each of the middle area 42 and the middle area 43 is the same. For example, when five small areas in the middle area 42 are arranged in order of referees A to E, five small areas in the middle area 43 are also arranged in order of referees A to E. By grouping, as the middle area, the display areas for each player instead of grouping the display areas for each referee, it is possible to provide a display in which a difference in determination of each referee on the same player may be easily recognized. Further, by arranging the small areas in the same order in both of the middle areas, it is possible to provide a display in which a tendency in determination of each referee may be easily recognized. For example, in a timeline 14 of FIG. 6, a red display is performed on the scales 45 corresponding to all referees in the middle area 42, and as a result, the scales 45 look as if one red line is displayed. By visually recognizing such a display, the senior referee is able to easily recognize a difference in determinations of the referees, such as whether the plurality of referees perform the same determination or whether only some referees perform determinations different from determinations of the other referees. The lines from the line of the referee A for the red corner to the line of the referee E for the blue corner are referred to, in order, as a display line 1, a display line 2, a display line 3, . . . , and a display line 10.

The output control unit 33b is a processing unit that displays the determination results of each referee, in real time, over the judgment monitoring screen 40 generated by the screen generation unit 33a. For example, each time a signal input from the acquisition unit 31 is received, the output control unit 33b specifies an output position and a display color according to the output conversion information 24, and displays an output corresponding to the signal at a position of the scale 45 (timeline) over the screen.

For example, it is assumed that the output control unit 33b receives the signal a at 11 seconds after the start of the round 1. In this case, the output control unit 33b specifies the output position (display line 1) and the display color (red color) associated with the signal a by referring to the output conversion information 24. The output control unit 33b outputs a red color to an eleventh line (timeline 11) of the scale 45 of the small area 44 of the referee A.

In a case where one referee counts a plurality of times for the same player at the same timeline, the number of times of counts is counted, while the display is performed one time. For example, when receiving the signal a after 11 seconds from the start of the match and further receiving the signal a at the same 11 seconds, the output control unit 33b outputs the display only one time by performing only the display for the first signal a, performing only the display for the last signal a, or performing overwrite display for each reception.

On the other hand, even when one referee performs counting a plurality of times for the same player at the same timeline, a yellow color is preferentially displayed. For example, when receiving the signal a at 8 seconds after the start of the match, the output control unit 33b outputs a red color corresponding to the signal a, and when further receiving the signal b at the same 8 seconds, the output control unit 33b preferentially outputs a yellow color corresponding to the signal b.

Returning to FIG. 2, the request processing unit 34 includes a request receiving unit 34a and a screen generation unit 34b, and is a processing unit that generates the judgment monitoring screen 40 in response to a request from each referee or a senior referee and outputs the judgment monitoring screen 40 to the display unit 22.

The request receiving unit 34a is a processing unit that receives a screen generation request from the tablet terminal 200 of each referee or an input by a senior referee. For example, when receiving a screen generation request (instruction) from the tablet terminal 200 of the referee via the communication unit 21, the request receiving unit 34a outputs a screen generation instruction to the screen generation unit 34b. When receiving a screen generation request from a senior referee via the display unit 22 or the like, the request receiving unit 34a outputs a screen generation instruction to the screen generation unit 34b.

When receiving a screen generation instruction from the request receiving unit 34a, the screen generation unit 34b generates and outputs the judgment monitoring screen 40. For example, the screen generation unit 34b generates the judgment monitoring screen 40 illustrated in FIG. 6, and outputs the determination results of each referee based on the collection result 25, over the judgment monitoring screen 40, by the same method as the method used in the real-time processing unit 33.

[Real-Time Display]

Next, a real-time update of the judgment monitoring screen 40 will be described with reference to FIGS. 7 to 11.

(Normal Display Example)

Figure 7:
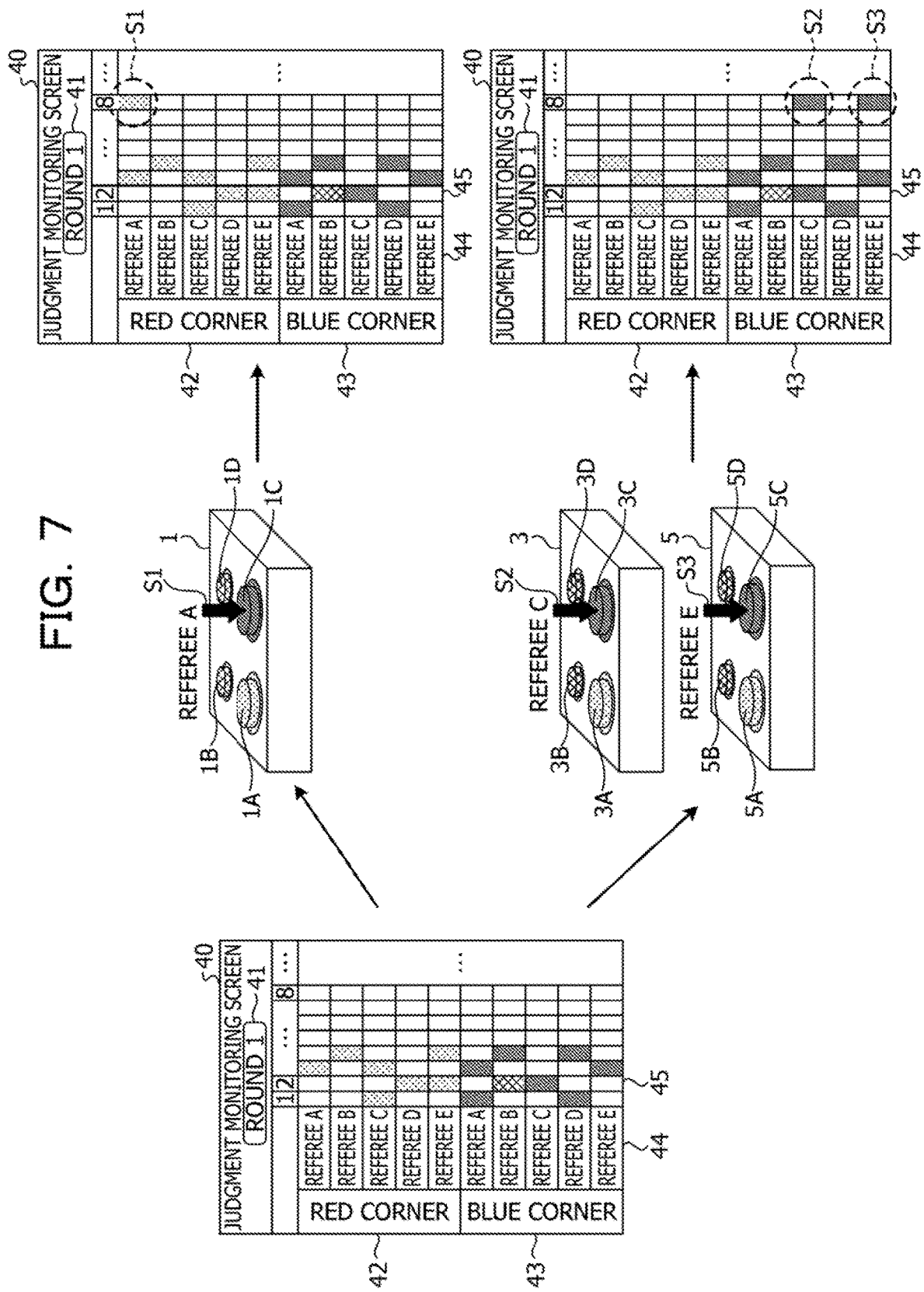
FIG. 7 is a diagram explaining a display example of the judgment monitoring screen.

FIG. 7 is a diagram explaining a display example of the judgment monitoring screen 40. As illustrated in FIG. 7, when the referee A presses the red button 1A of the input device 1 at 8 seconds after the start of the round 1, the real-time processing unit 33 updates the scale 45 corresponding to the timeline 8 of the small area 44 of the referee A in the middle area 42 for the red corner within the judgment monitoring screen 40, with a red color (S1).

When the referee C presses the blue button 3C of the input device 3 at 8 seconds after the start of the round 1, the real-time processing unit 33 updates the scale 45 corresponding to the timeline 8 of the small area 44 of the referee C in the middle area 43 for the blue corner within the judgment monitoring screen 40, with a blue color (S2).

Similarly, when the referee E presses the blue button 5C of the input device 5 at 8 seconds after the start of the round 1, the real-time processing unit 33 updates the scale 45 corresponding to the timeline 8 of the small area 44 of the referee E in the middle area 43 for the blue corner within the judgment monitoring screen 40, with a blue color (S3).

(Priority Display Example)

Figure 8:
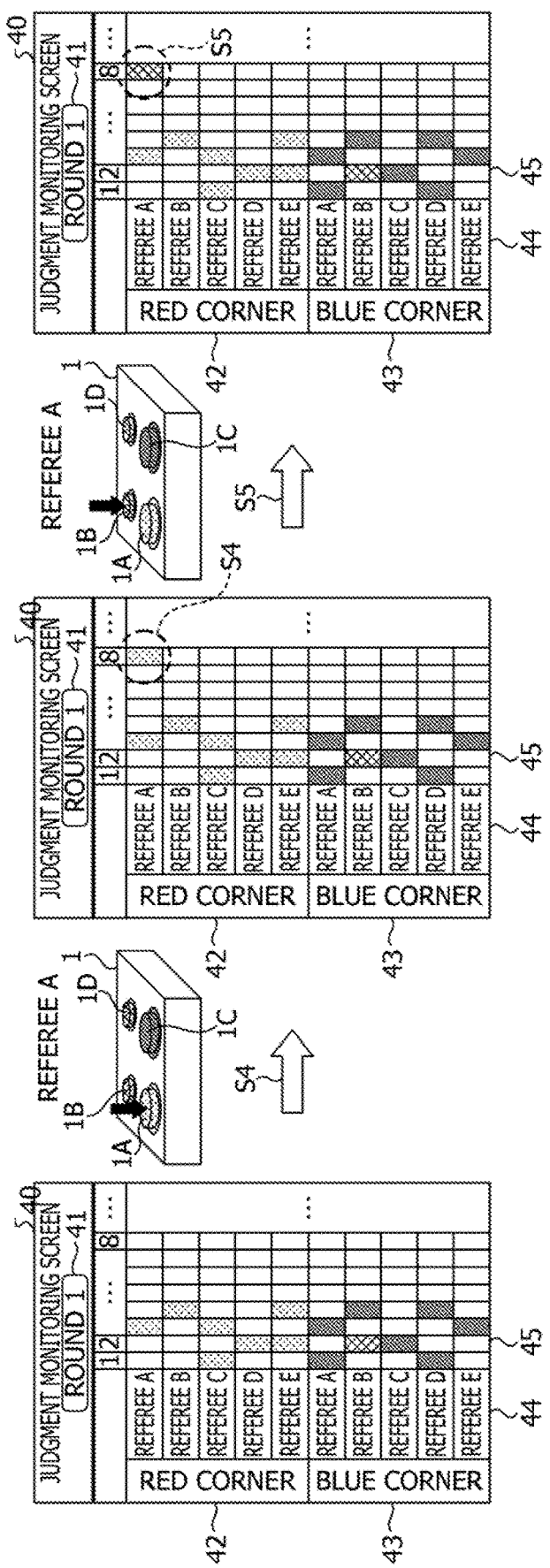
FIG. 8 is a diagram explaining a priority display example of the judgment monitoring screen.
Figure 9:
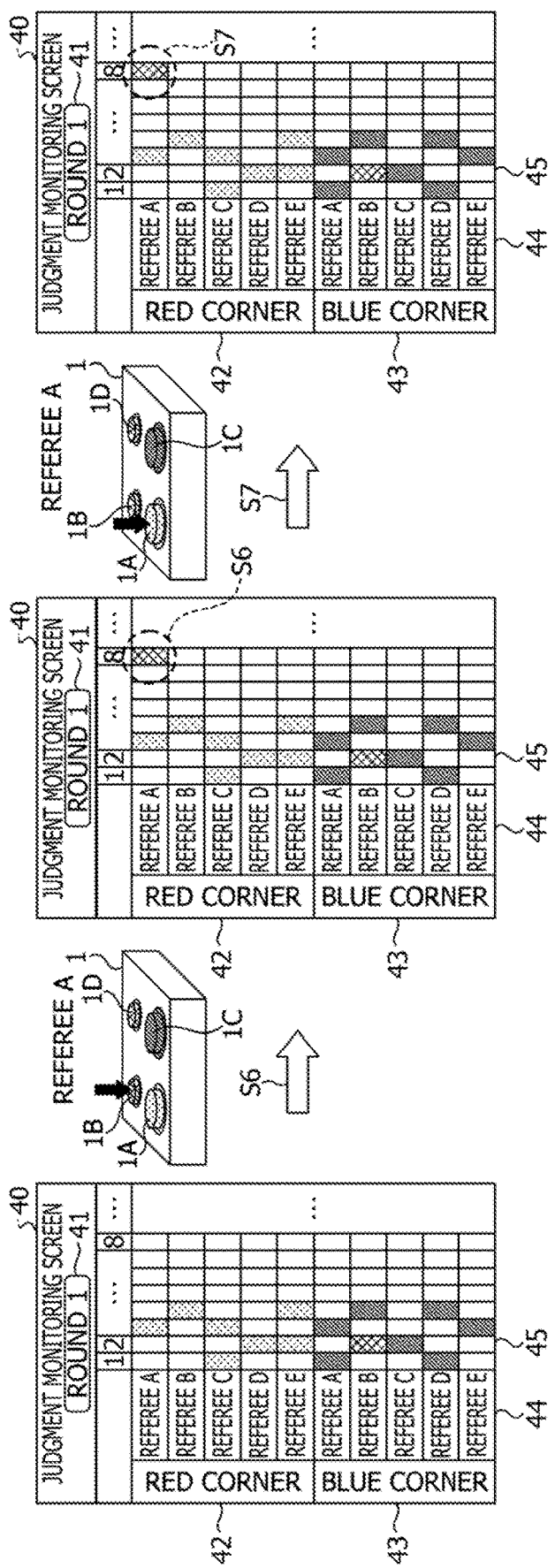
FIG. 9 is a diagram explaining a priority display example of the judgment monitoring screen.

FIG. 8 and FIG. 9 are diagrams explaining a priority display example of the judgment monitoring screen 40. As illustrated in FIG. 8, when the referee A presses the red button 1A of the input device 1 at 8 seconds after the start of the round 1, the real-time processing unit 33 updates the scale 45 corresponding to the timeline 8 of the small area 44 of the referee A in the middle area 42 for the red corner within the judgment monitoring screen 40, with a red color (S4). When the referee A further presses the yellow button 1B of the input device 1 at 8 seconds after the start of the round 1 at the same time, the real-time processing unit 33 updates the scale 45 corresponding to the timeline 8 of the small area 44 of the referee A, which is updated with a red color in S3, with a yellow color (S5).

As illustrated in FIG. 9, when the referee A presses the yellow button 1B of the input device 1 at 8 seconds after the start of the round 1, the real-time processing unit 33 updates the scale 45 corresponding to the timeline 8 of the small area 44 of the referee A in the middle area 42 for the red corner within the judgment monitoring screen 40, with a yellow color (S6). Further, when the referee A presses the red button 1A of the input device 1 again at 8 seconds after the start of the round 1 at the same time, the real-time processing unit 33 does not update the scale 45 from a yellow color to a red color, and maintains the scale 45 with a yellow color updated in S6 (S7).

(Other Display Examples)

Figure 10:
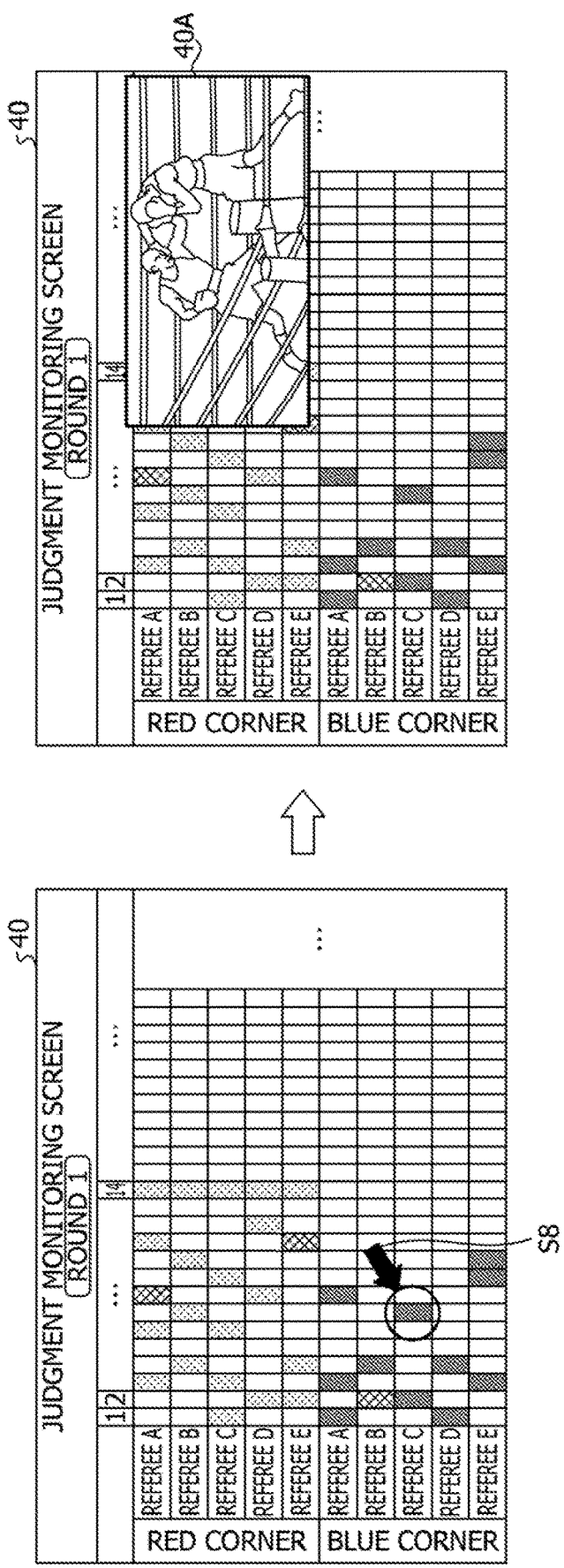
FIG. 10 is a diagram explaining a display example of a match image on the judgment monitoring screen.

FIG. 10 is a diagram explaining a display example of a match image on the judgment monitoring screen 40. The real-time processing unit 33 is able to also display a match image on the judgment monitoring screen. As illustrated in FIG. 10, when detecting selection of the scale 45 corresponding to a certain timeline of the small area 44 of the referee C in the middle area 43 for the blue corner within the judgment monitoring screen 40 (S8), the real-time processing unit 33 acquires an image captured at the same time as the selected timeline from the moving image information 26. The real-time processing unit 33 outputs the acquired image 40A to an area in the judgment monitoring screen 40 that does not overlap with the selected position (timeline).

Here, when outputting the image 40A, the real-time processing unit 33 may divide the inside of the judgment monitoring screen 40 into, for example, four areas, and output the image 40A to an area to which the timeline of the position of the selected scale 45 does not belong. In the example of FIG. 10, since the timeline in the lower left area within the judgment monitoring screen is selected, it is considered that the image 40A is output to the upper right area diagonally positioned with respect to the area. By determining the display position of the image 40A in this manner, it is possible to provide a screen on which the referee who visually recognizes an image is able to confirm the match image while allowing the referee to recognize the position of the timeline designated by the referee himself/herself. The real-time processing unit 33 is able to output not only an image but also a moving image. For example, the real-time processing unit 33 is able to output a moving image of several seconds before and after the selected timeline. For example, in a case where the timeline 8, which corresponds to 8 seconds after the start of the round 1, is selected, the real-time processing unit 33 is able to output a moving image from 5 seconds to 11 seconds after the start of the round 1, a moving image from 5 seconds to 8 seconds after the start of the round 1, or a moving image from 8 seconds to 11 seconds after the start of the round 1.

FIG. 11 is a diagram explaining a progress display example of the judgment monitoring screen 40. As described above, after the start of the match, when a certain referee performs an effective determination and presses the button of the input device, a red color, a blue color, a yellow color, or the like is displayed in the judgment monitoring screen 40. Therefore, a senior referee or the like who views the judgment monitoring screen 40 is able to easily recognize a progress of the match over the screen.

On the other hand, in a case of a tight match, a period of time for which an effective attack does not occur may be long. In this case, a time for which there is no color display in the judgment monitoring screen 40 becomes long, and as a result, it may be expected that a senior referee may not recognize a progress of the match over the screen. For this reason, as illustrated in FIG. 11, the real-time processing unit 33 changes a display of an area in which a predetermined time is elapsed to a shaded area 40B or the like. For example, the real-time processing unit 33 changes a background color of an area in which a predetermined time is elapsed to a background color, which is different from a background color of an area in which a predetermined time is not yet elapsed. For example, as illustrated in FIG. 11, the real-time processing unit 33 displays a progress of the match over the screen in an easy-to-understand manner by increasing the shaded area 40B by one timeline each time 1 second is elapsed.

[Display of Collection Result]

Next, an example in which the determination results of each referee are collected and displayed on the judgment monitoring screen 40 will be described with reference to FIGS. 12 to 14.

Figure 12:
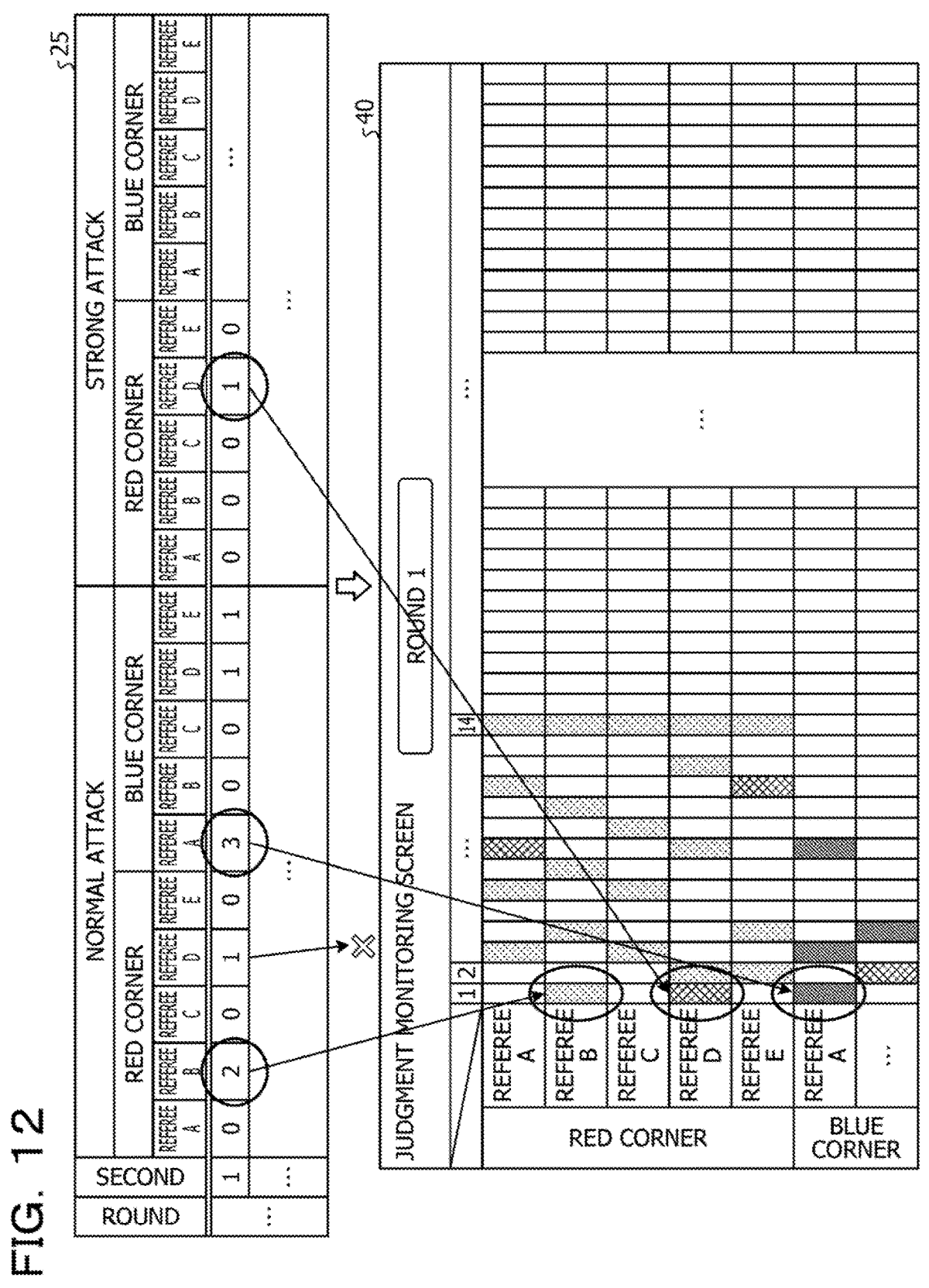

FIG. 12 is a diagram explaining an example of generation of a judgment monitoring screen based on a collection result. As illustrated in FIG. 12, the request processing unit 34 reads the collection result 25, generates a judgment monitoring screen 40 according to a display rule described in the real-time processing unit 33, and outputs the judgment monitoring screen 40.

For example, when the request processing unit 34 reads, as a count result of the normal attack at the timeline 1 of the round 1, a count result "two times" of the referee B for the red corner, the request processing unit 34 updates the scale 45 corresponding to the timeline 1 of the small area 44 of the referee B in the middle area 42 for the red corner within the judgment monitoring screen 40, with a red color. Similarly, when the request processing unit 34 reads, as a count result of the normal attack at the timeline 1 of the round 1, a count result "three times" of the referee A for the blue corner, the request processing unit 34 updates the scale 45 corresponding to the timeline 1 of the small area 44 of the referee A in the middle area 43 for the blue corner within the judgment monitoring screen 40, with a blue color.

The request processing unit 34 specifies that the normal attack count result of the referee D for the red corner at the timeline 1 of the round 1 is "one time". Further, the request processing unit 34 specifies that the strong attack count result of the referee D for the red corner at the timeline 1 of the round 1 is "one time". In this case, the strong attack is prioritized compared to the normal attack, and thus the request processing unit 34 updates the scale 45 corresponding to the timeline 1 of the small area 44 of the referee D in the middle area 42 for the red corner within the judgment monitoring screen 40, with a yellow color, without displaying the scale 45 with a red color.

When receiving a specific operation such as selecting each referee in the judgment monitoring screen 40, the request processing unit 34 is able to generate and display a determination result of each referee. FIG. 13 is a diagram explaining a determination result screen 50 of each referee. For example, the request processing unit 34 counts a count number in response to the request by referring to the collection result 25, and outputs the count number.

Figure 13:
FIG. 13 is a diagram explaining a determination result screen of each referee.
Figure 14:
FIG. 14 is a diagram explaining a comparison screen of determination results of each referee.

For example, in a case where one match includes three rounds, as illustrated in FIG. 13, when the referee C is selected, the request processing unit 34 generates a determination result screen 50 and displays the determination result screen 50 on the display unit 22 of the monitor device 20 or the tablet terminals 200, the determination result screen 50 being a screen which displays, for each of the red corner and the blue corner, the total count number of the normal attack and the total count number of the strong attack in the round 1 to the round 3 and the total count number (TOTAL) in the round 1 to the round 3.

The request processing unit 34 is able to generate and output a comparison screen 60 of determination results of each referee in response to a request from a senior referee or the like. FIG. 14 is a diagram explaining a comparison screen 60 of determination results of each referee. As illustrated in FIG. 14, the request processing unit 34 generates a comparison screen 60 and displays the comparison screen 60 on the display unit 22 of the monitor device or the tablet terminals 200, the comparison screen 60 being a screen which displays, for each of the red corner and the blue corner of each referee, the count number of the normal attacks and the count number of the strong attacks in each round, the total count number of the normal attacks, and the total count number of the strong attacks.

The request processing unit 34 is able to highlight a very-small count number or a very-large count number over the comparison screen 60. For example, the request processing unit 34 may calculate an average value of the normal attacks of the referees for the red corner in the round 1, and highlight an area having a count number smaller than or larger than the average value by a threshold value or more.

[Flow of Real-Time Display Processing]

Figure 15:
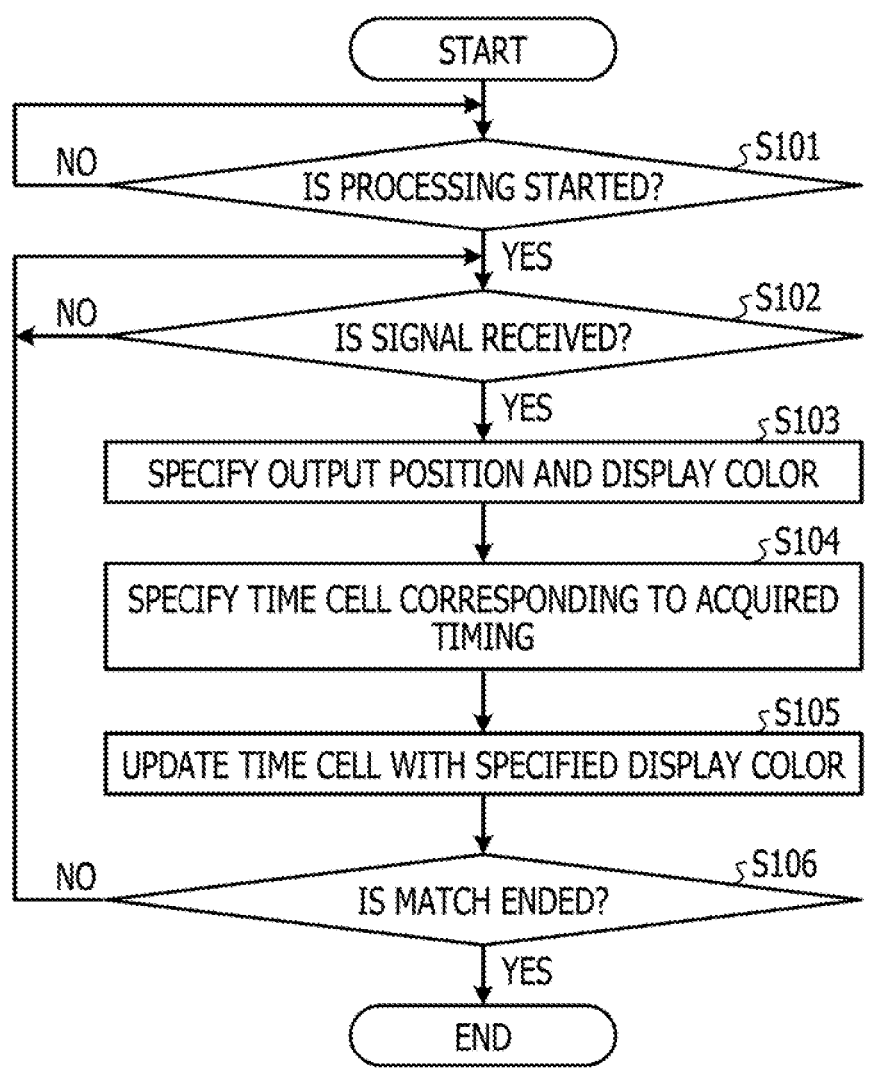
FIG. 15 is a flowchart illustrating a flow of real-time display processing.

FIG. 15 is a flowchart illustrating a flow of real-time display processing. As illustrated in FIG. 15, when processing is started, the real-time processing unit 33 displays the judgment monitoring screen 40 in an initial state in which red, blue, and yellow colors are not displayed on any of the scales 45 (Yes in S101), and when a signal is received (Yes in S102), the real-time processing unit 33 specifies an output position and a display color based on the output conversion information 24 (S103).

The real-time processing unit 33 specifies a time cell corresponding to a timing at which the first input or the second input is acquired at a timeline corresponding to the output position (a line corresponding to the small area) determined in S103 (S104). The real-time processing unit 33 updates the time cell specified in S104 at the timeline corresponding to the output position specified in S103, with the display color specified in S103 (S105). For example, the specific time cell is updated from a gray color to any one color of red, blue, and yellow colors. In a case where there are a plurality of inputs within 1 second, for example, in a case where any one color of red, blue, and yellow colors is already displayed in the same time cell, the real-time processing unit 33 updates the time cell with a color corresponding to the newly received signal. Here, in a case where a yellow color is preferentially displayed, when a yellow color is already displayed in the time cell, the real-time processing unit 33 may not update the time cell with another color.

Thereafter, the real-time processing unit 33 repeatedly executes processing of step S102 and subsequent steps until the match ends (No in S106). When the match ends (Yes in S106), the real-time processing unit 33 ends the processing.

[Flow of Display Processing of Collection Result]

Figure 16:
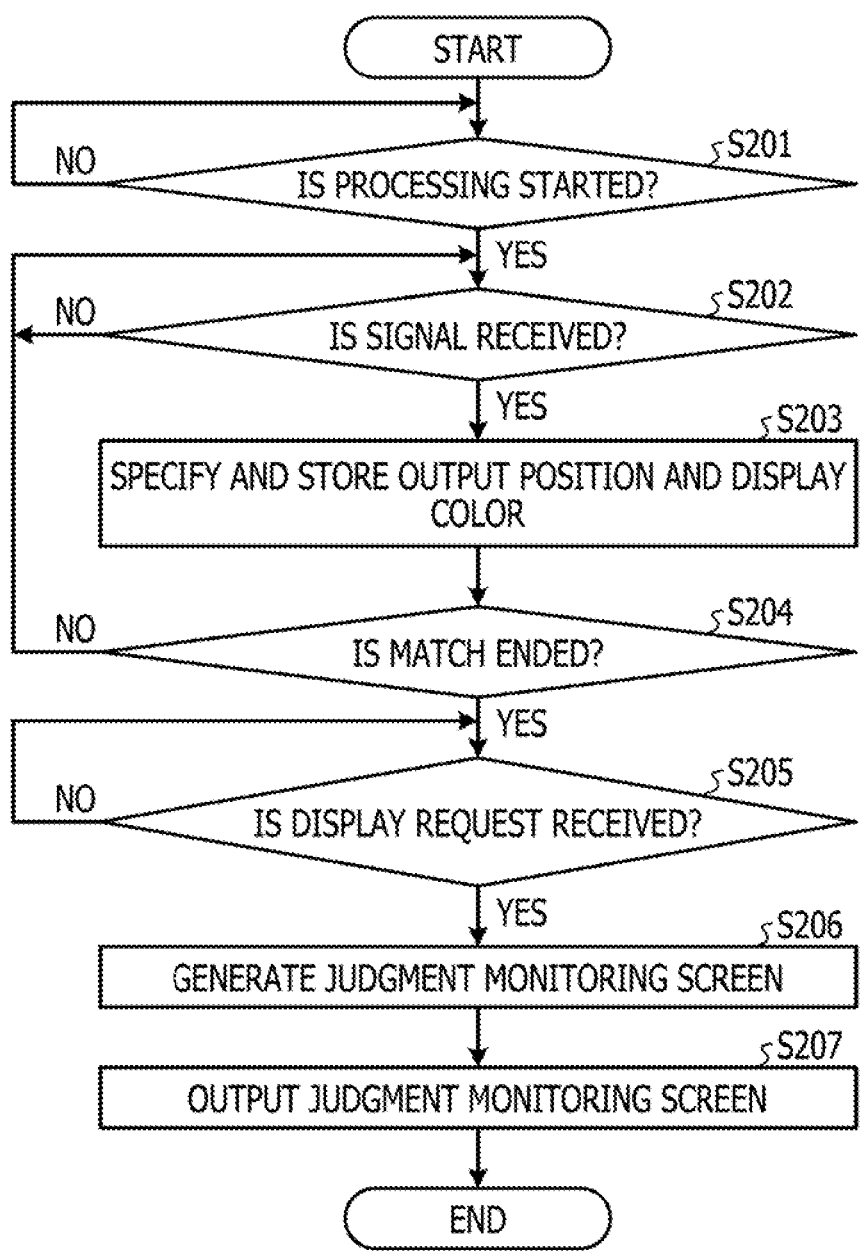
FIG. 16 is a flowchart illustrating a flow of display processing of the collection result.

FIG. 16 is a flowchart illustrating a flow of display processing of the collection result. As illustrated in FIG. 16, when processing is started (Yes in S201) and a signal is received (Yes in S202), the count unit 32 specifies an output position and a display color based on the output conversion information 24 and stores the output position and the display color in the collection result 25 (S203).

The count unit 32 repeatedly executes processing of step S202 and subsequent steps until the match ends (No in S204). On the other hand, when the match ends (Yes in S204) and a display request or the like is received (Yes in S205), the request processing unit 34 generates a judgment monitoring screen by counting count results of each attack based on the collection result 25 (S206), and outputs the generated judgment monitoring screen 40 (S207).

The request processing unit 34 is able to generate and output the judgment monitoring screen 40 based on the collection result by using the collection result up to a timing even in the match.

[Effects]

As described above, the monitor device 20 is able to collectively display the input timings at which each referee inputs the effective attack, on the timeline, for each player. As a result, a senior referee, who is a person in charge of monitoring, is able to compare and examine whether determination of a referee is not biased. Therefore, it is possible to ensure transparency in the determinations of each referee and transparency in the match result. In addition, it is possible to reduce incorrectness and unfairness of the determination result. Further, it is possible to improve the value of the match, and this leads to an increase of spectators.

The monitor device 20 is able to generate and output the determination result screen 50 of each referee and the comparison screen 60 of each referee. Thus, the monitor device 20 is able to output effective information for training of each referee. For example, each referee may examine a difference between the input timing of the referee himself/herself and the input timing of another referee by examining the judgment monitoring screen 40, and thus a scoring skill of each referee is improved. Further, each referee may compare the determination result of the referee himself/herself with the determination result of another referee by referring to the determination result screen 50 and the comparison screen 60, and thus a scoring skill of each referee is improved.

Embodiment 2

In Embodiment 1, an example in which useful information is generated and output to each referee or a senior referee has been described. On the other hand, the monitor device 20 is able to generate and output useful information for enjoying a match, to spectators in a match field or viewers of match images provided via communication such as television broadcasting or the Internet.

For example, a point addition status and a determination result by each referee are displayed to spectators or viewers after the end of the round or the end of the match. For this reason, spectators or viewers are not able to know what kind of defense or what kind of attack is determined as a point addition target. As a result, there may be dissatisfaction on the determination result of the match.

In Embodiment 2, an example of improving immersion and satisfaction of spectators or viewers by displaying, in real time, to the spectators or the viewers, the timings and the number of times each referee determines an effective attack as a point addition target will be described.

[Overall Configuration]

Figure 17:
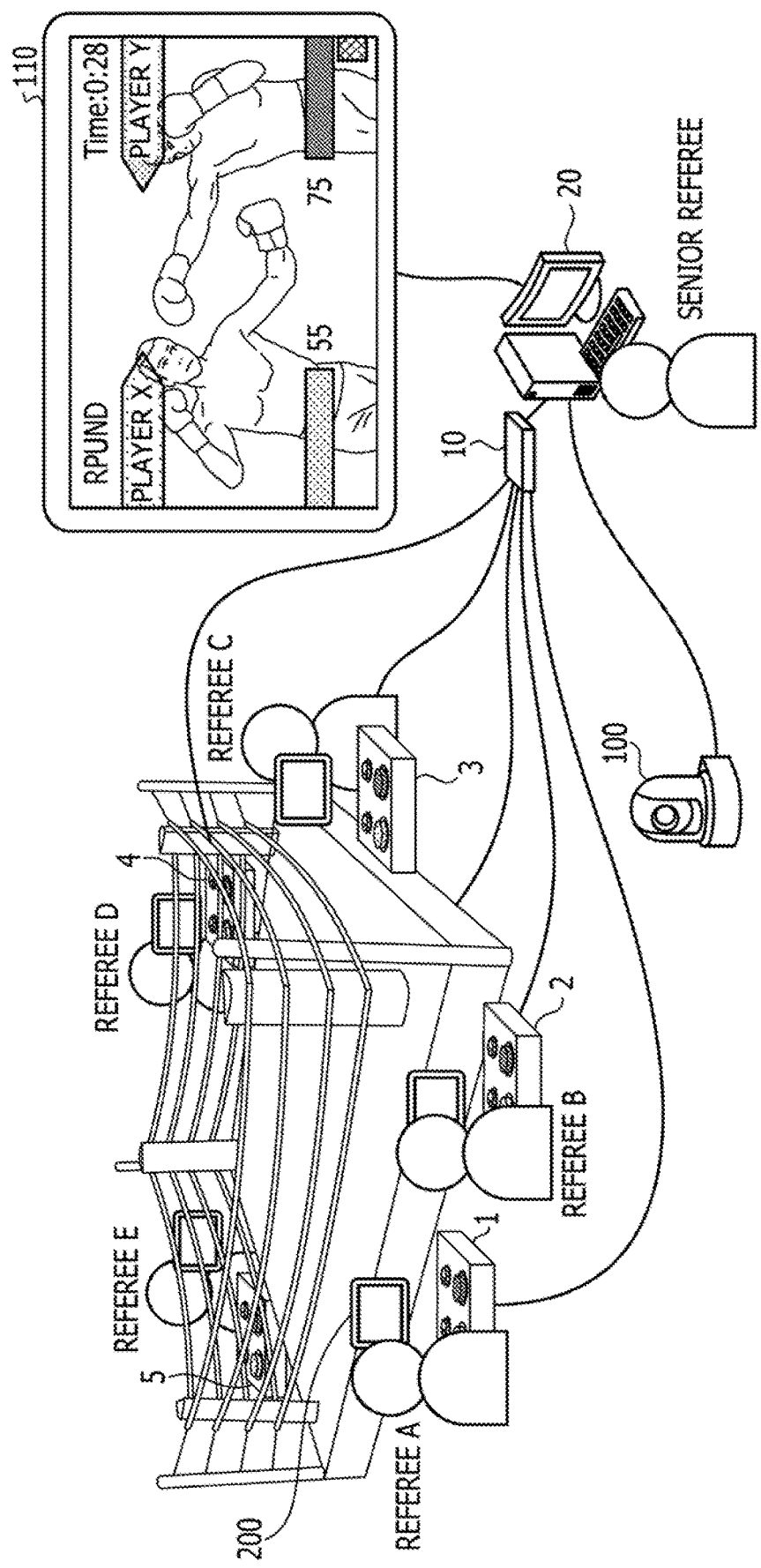
FIG. 17 is a diagram explaining an example of an overall configuration of a judgment monitoring system according to Embodiment 2.

FIG. 17 is a diagram explaining an example of an overall configuration of a judgment monitoring system according to Embodiment 2. A difference from the judgment monitoring system according to Embodiment 1 illustrated in FIG. 1 is that a control unit for controlling a display of a large vision 110 provided in a match field is provided. Hereinafter, an example in which the monitor device 20 used by a senior referee controls a display of the large vision 110 will be described. On the other hand, another device that manages inputs of the referees may control a display of the large vision 110.

As in Embodiment 1, the monitor device 20 collects a timing at which each referee performs an effective determination such as a normal attack or a strong attack, and displays the timing on the large vision 110 in real time. In this way, real-time display in which the attacks and defenses of the players are associated with the determinations of the referees is realized, and thus a degree of excitement of spectators or viewers is increased. Therefore, entertainment in which transparency in the determinations of each referee is ensured is realized. The large vision 110 may be provided outside the match field. In a case where the large vision 110 is viewed by one person or a small number of persons, the large vision 110 may not be large, and may be realized as a display of a television receiver or a computer.

[Functional Configuration]

Figure 18:
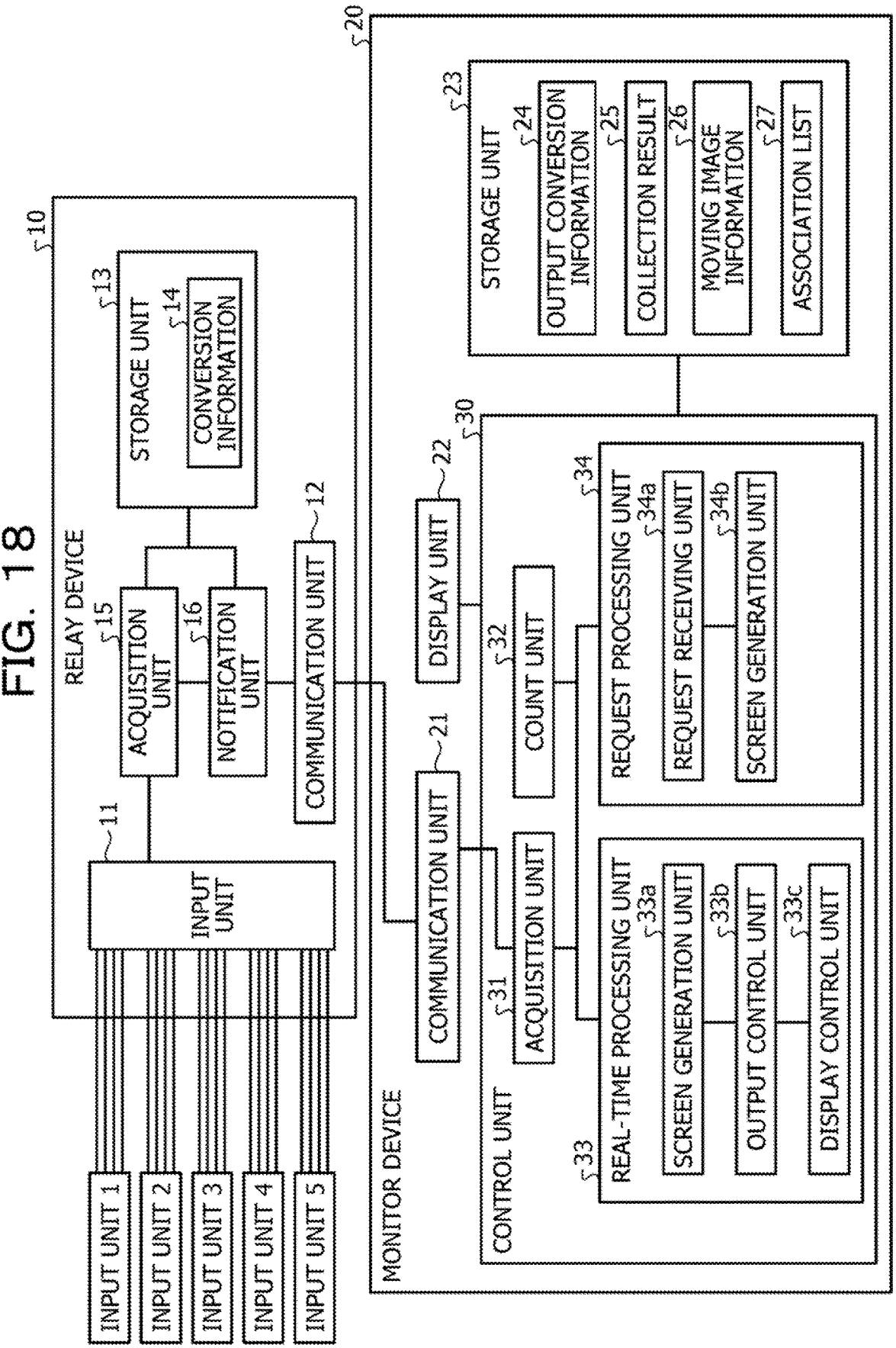
FIG. 18 is a functional block diagram illustrating a functional configuration of the judgment monitoring system according to Embodiment 2.

FIG. 18 is a functional block diagram illustrating a functional configuration of a judgment monitoring system according to Embodiment 2. As illustrated in FIG. 18, a difference from the judgment monitoring system according to Embodiment 1 illustrated in FIG. 2 is that the real-time processing unit 33 of the monitor device 20 includes a display control unit 33c. The other processing units and the like are the same as those in FIG. 2, and thus a detailed description thereof will be omitted. In Embodiment 2, an example in which the processing units have the functions of Embodiment 1 will be described. On the other hand, the present disclosure is not limited thereto, and the functions may be realized by only processing units of Embodiment 2 to be described.

The display control unit 33c is a processing unit that collects a timing at which each referee performs an effective determination such as a normal attack or a strong attack and outputs the timing to an output target such as the large vision 110 in real time. For example, each time a signal indicating that each referee determines a normal attack or a strong attack is received, the display control unit 33c performs counting for each of the red corner and the blue corner, and outputs the totalization result.

(Display Example)

Figure 19:
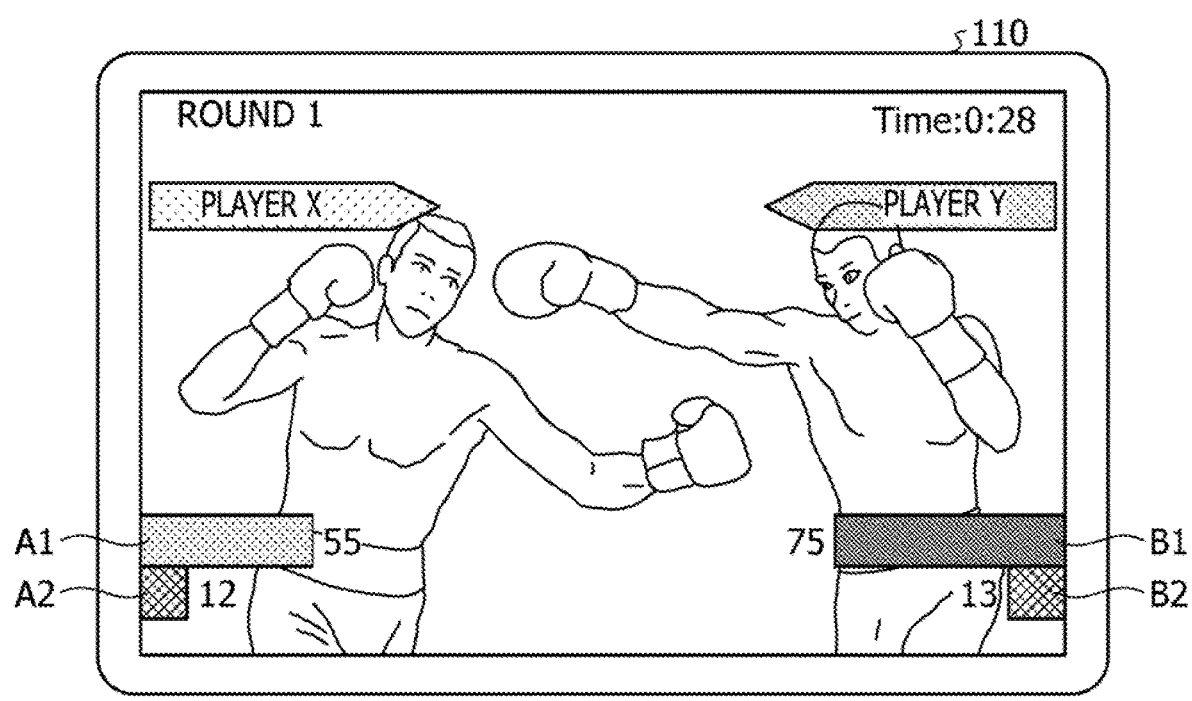
FIG. 19 is a diagram explaining an example in which information is output to a large vision.

Here, information output by the display control unit 33c will be specifically described. FIG. 19 is a diagram explaining an example in which information is output to the large vision 110. As illustrated in FIG. 19, the display control unit 33c generates a display screen and outputs the display screen to the large vision 110, the display screen being a screen in which moving images of the player X in the red corner and the player Y in the blue corner during a match are displayed as a background, and in which a display gauge representing, by a length, the number of times (the number of counts) each referee determines an effective attack is displayed so as to extend from both left and right ends toward the center.

For example, the display control unit 33c generates and outputs a red display gauge A1 indicating the number of times each referee determines a normal attack of the red corner (player X) and a yellow display gauge A2 Indicating the number of times each referee determines a strong attack of the red corner (player X). Similarly, the display control unit 33c generates and outputs a blue display gauge B1 indicating the number of times each referee determines a normal attack of the blue corner (player Y) and a yellow display gauge B2 indicating the number of times each referee determines a strong attack of the blue corner (player Y).

The display control unit 33c may adopt any moving image or any still image as the background. For example, the display control unit 33c may output, as a background, an image representing a player, such as an image captured in a pre-match interview or a face photograph of the player, or may output, as a background, a real-time match video captured by the video camera 100.

Figure 20:
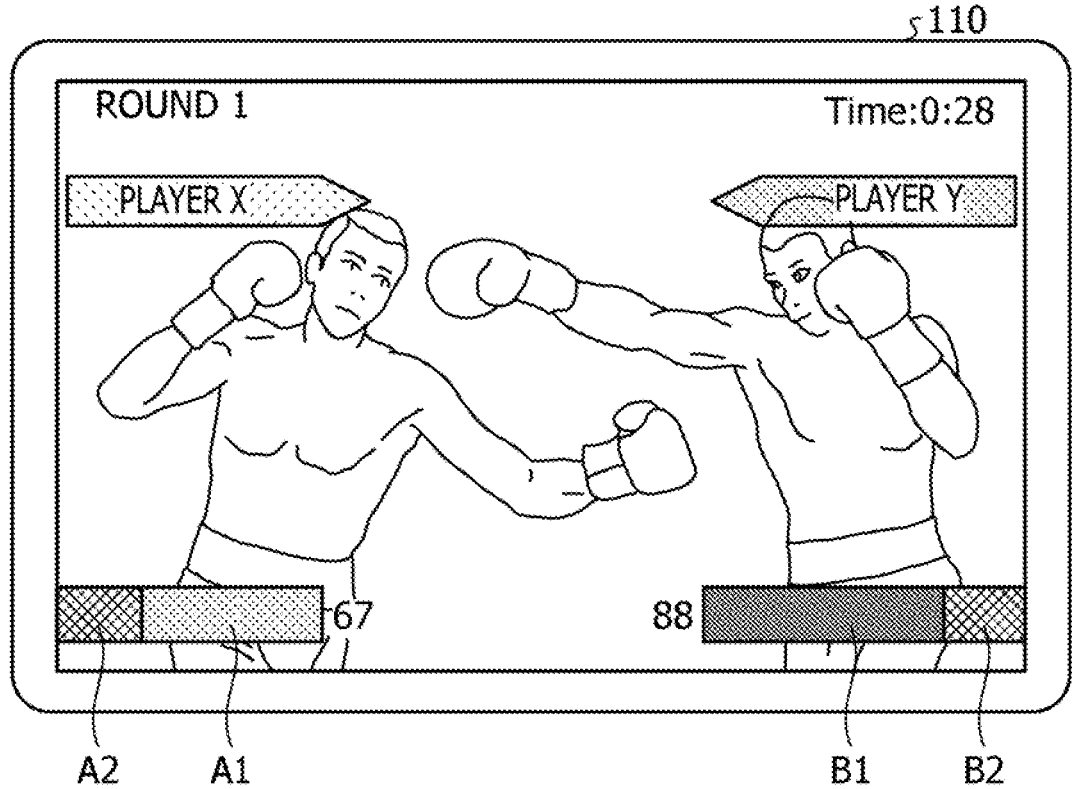
FIG. 20 is a diagram explaining another example in which information is output to the large vision.

The output method of each display gauge may be freely selected and changed. FIG. 20 is a diagram explaining another example in which information is output to the large vision 110. As illustrated in FIG. 20, the display control unit 33c may output the display gauge of the normal attack and the display gauge of the strong attack of each corner (player), as one display gauge.

For example, the display control unit 33c generates and outputs one display gauge from the red display gauge A1 indicating the number of times of normal attacks of the red corner (player X) and the yellow display gauge A2 indicating the number of times of strong attacks of the red corner (player X), and outputs the total count value of the attacks around the display gauge. Similarly, the display control unit 33c generates and outputs one display gauge from the blue display gauge B1 indicating the number of times of normal attacks of the blue corner (player Y) and the yellow display gauge B2 indicating the number of times of strong attacks of the blue corner (player Y), and outputs the total count value of the attacks around the display gauge.

In addition, the display control unit 33c may output not only the number of times of determinations of effective attacks by the referees, but also the number of times of warnings issued to a player who commits a foul or performs a dangerous attack, the number of times of dominations in which each referee, a senior referee, a commentator, or the like determines dominance in the match, and the like. The display control unit 33c may also display the meaning of each display gauge in order to inform spectators or the like of the meaning of each display gauge.

Figure 21:
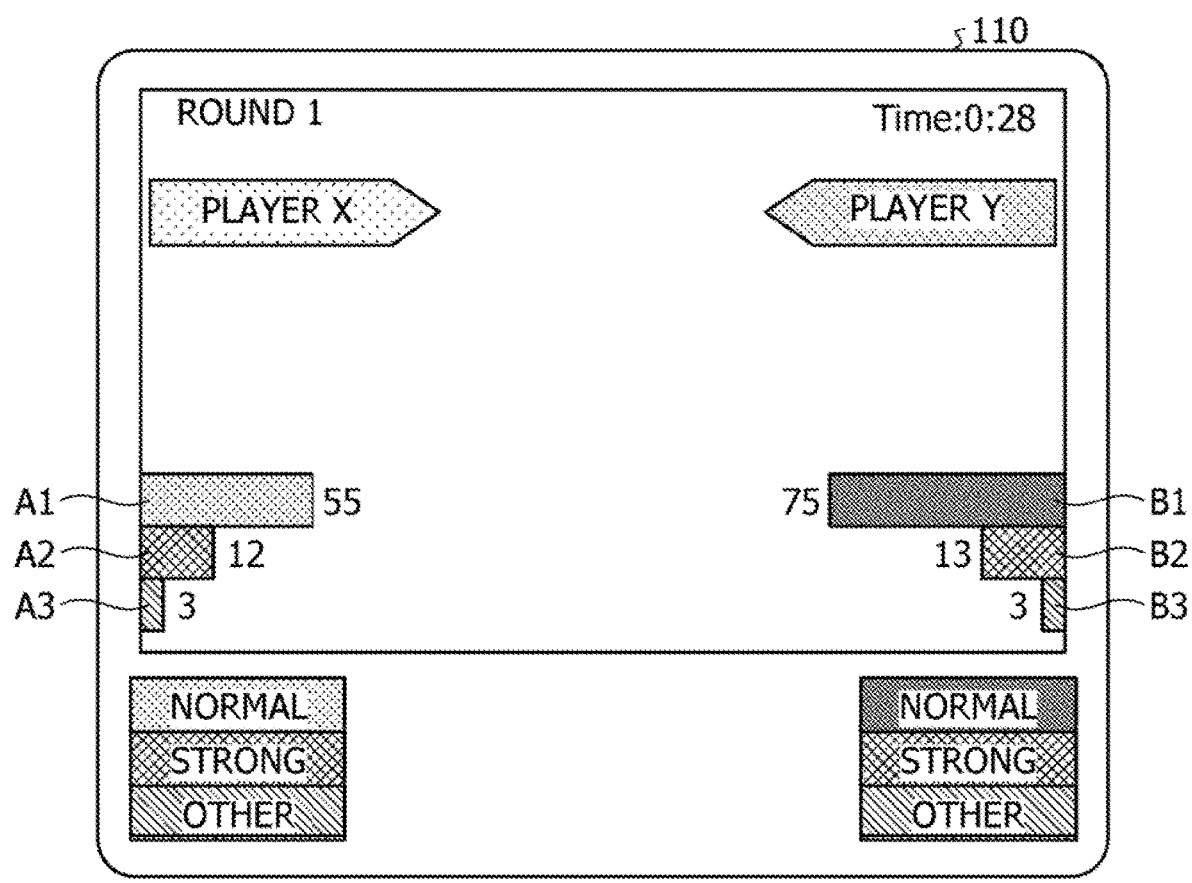
FIG. 21 is a diagram explaining still another example in which information is output to the large vision.

FIG. 21 is a diagram explaining still another example in which information is output to the large vision 110. As illustrated in FIG. 21, in addition to the display gauges A1, A2, B1, and B2 described in FIG. 19, the display control unit 33c generates and outputs a screen including a display gauge A3, a display gauge B3, and descriptions of each display gauge. Here, the display gauge A3 Indicates the number of times of warnings or dominations issued to the player X of the red corner, and the display gauge B3 indicates the number of times of warnings or dominations issued to the player Y of the blue corner. The dominations or the warnings may be counted by a notification from the tablet terminal 200 of each referee or a senior referee.

In addition, the display control unit 33c generates and outputs a correspondence relationship indicating that the display gauges A1 and B1 correspond to normal attacks, that the display gauges A2 and B2 correspond to strong attacks, and that the display gauges A3 and B3 correspond to others other than attacks. At this time, the display control unit 33c outputs the correspondence relationship in a visually understandable manner by matching a color display of the correspondence relationship with each display gauge. The display control unit 33c may generate the correspondence relationship based on the output conversion information 24 or designation by a user.

(Display Update)

The display control unit 33c updates the length of each display gauge in association with the number of times each referee presses each button, and displays a numerical value indicating the current number of determinations (the number of counts) around the display gauge. For example, in the example of FIG. 19, when the referee A presses the red button 1A one time, the display control unit 33c increases the length of the display gauge A1 by one level and updates the numerical value from 55 to 56. Similarly, when the referee C presses the yellow button 3D one time, the display control unit 33c increases the length of the display gauge B2 by one level and updates the numerical value from 13 to 14.

Figure 22:
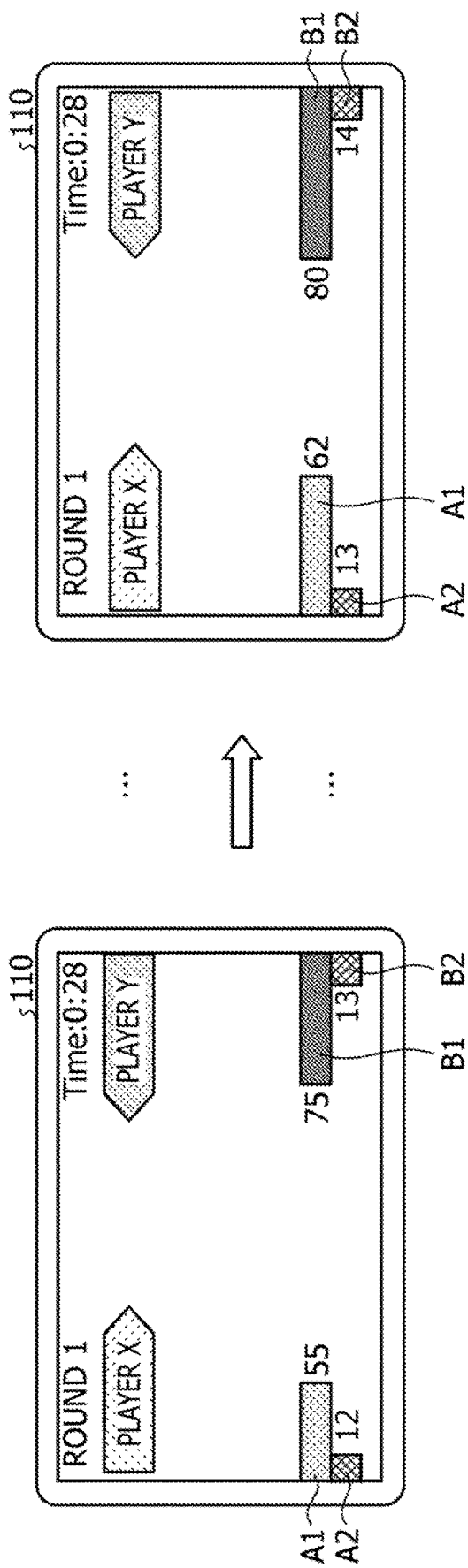
FIG. 22 is a diagram explaining an example of display update.

The display update will be described in detail with reference to FIG. 22. FIG. 22 is a diagram explaining an example of display update. For example, it is assumed that each referee presses the red button seven times in total and presses the yellow button one time in total for the player X in the red corner. In this case, as illustrated in FIG. 22, the display control unit 33c increases the length of the display gauge A1 by seven levels and updates the numerical value from "55" to "62", and increases the length of the display gauge A2 by one level and updates the numerical value from "12" to "13".

Similarly, for example, it is assumed that each referee presses the blue button five times in total and presses the yellow button one time in total for the player Y in the blue corner. In this case, as illustrated in FIG. 22, the display control unit 33c increases the length of the display gauge B1 by five levels and updates the numerical value from "75" to "80", and increases the length of the display gauge B2 by one level and updates the numerical value from "13" to "14". Thereby, it possible to visually notify spectators or the like of the number of times of effective attacks.

(Reduction of Display Gauge)

It is difficult to know in advance how many times a button is pressed during a match. For this reason, when a button is pressed many times, the display gauges corresponding to each player become long. As a result, the display gauges may overlap with each other or it may be difficult to visually recognize the display gauges. Therefore, in a case where the length of the display gauge reaches a predetermined value or the count number reaches a threshold value, the display control unit 33c is able to update the screen to a screen in which the length of the display gauge is reduced such that spectators or the like are able to easily view the screen.

Figure 23:
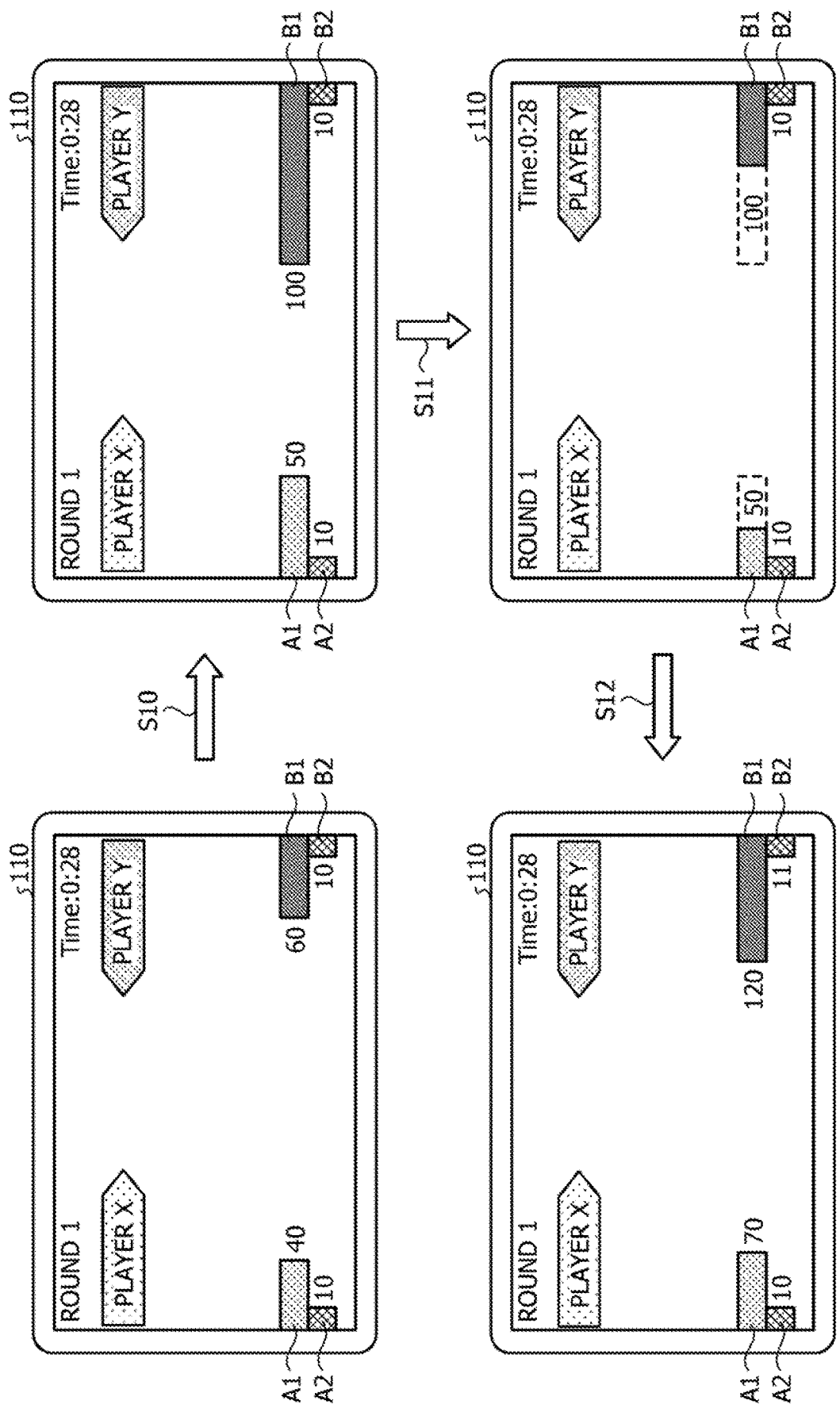
FIG. 23 is a diagram explaining an example of display reduction.

FIG. 23 is a diagram explaining an example of display reduction. As illustrated in FIG. 23, in a state where the display gauge A1 is 40, the display gauge A2 is 10, the display gauge B1 is 60, and the display gauge B2 is 10, when effective attacks are counted, it is assumed that the display control unit 33c updates the display gauge A1 to 50, the display gauge A2 to 10, the display gauge B1 to 100, and the display gauge B2 to 10 (S10).

At this time, in a case where the threshold value of the count number is set to 100, since the count number reaches 100 as the threshold value, the display control unit 33c updates the screen by reducing the display gauges of the normal attacks of each corner (both players) (S11). Although an example in which the threshold value is set for the count number is described here, the threshold value may be set for the length of the display gauge as described above. For example, a length of the display gauge corresponding to 100 counts may be set as the threshold value, or a length of the display gauge corresponding to a predetermined length over the display screen may be set as the threshold value. In processing of reducing the display gauge, for example, the display control unit 33c reduces the length of the display gauge B1 for the blue corner in which the count number reaches 100 as the threshold value, in half, and also reduces the length of the display gauge A1 for the red corner corresponding to the normal attacks, in half, in accordance with the reduction of the display gauge. At this time, the display control unit 33c reduces the display gauge while outputting the numerical value as it is.

Thereafter, the display control unit 33c changes a method of increasing the display gauge. When each referee determines an effective attack, the display control unit 33c updates the length of the display gauge with a scale of ½ as compared with the length of the display gauge before execution of reduction, while updating the numerical value as usual (S12). For example, before reduction of the display gauge, when a button is pressed one time, the display control unit 33c increases the length of the display gauge by one level. On the other hand, after the display gauge is reduced by ½, when a button is pressed two times, the display control unit 33c increases the length of the display gauge by one level.

Thereby, even when the count number increases, spectators or the like may not have a difficulty in viewing the display gauge. Thereafter, when the count number reaches again 100 as the threshold value, for example, when the count number reaches 200 in total, the display control unit 33c further reduces the display gauge in half, and updates the length of the display gauge with a scale of ¼.

Here, FIG. 23 illustrates an example in which, when the count number of the normal attacks of any player reaches the threshold value, only the display gauges of the normal attacks of both players are reduced. On the other hand, the present disclosure is not limited thereto. For example, when a certain display gauge is reduced, other display gauges may be reduced in accordance with the reduction of the display gauge.

Figure 24:
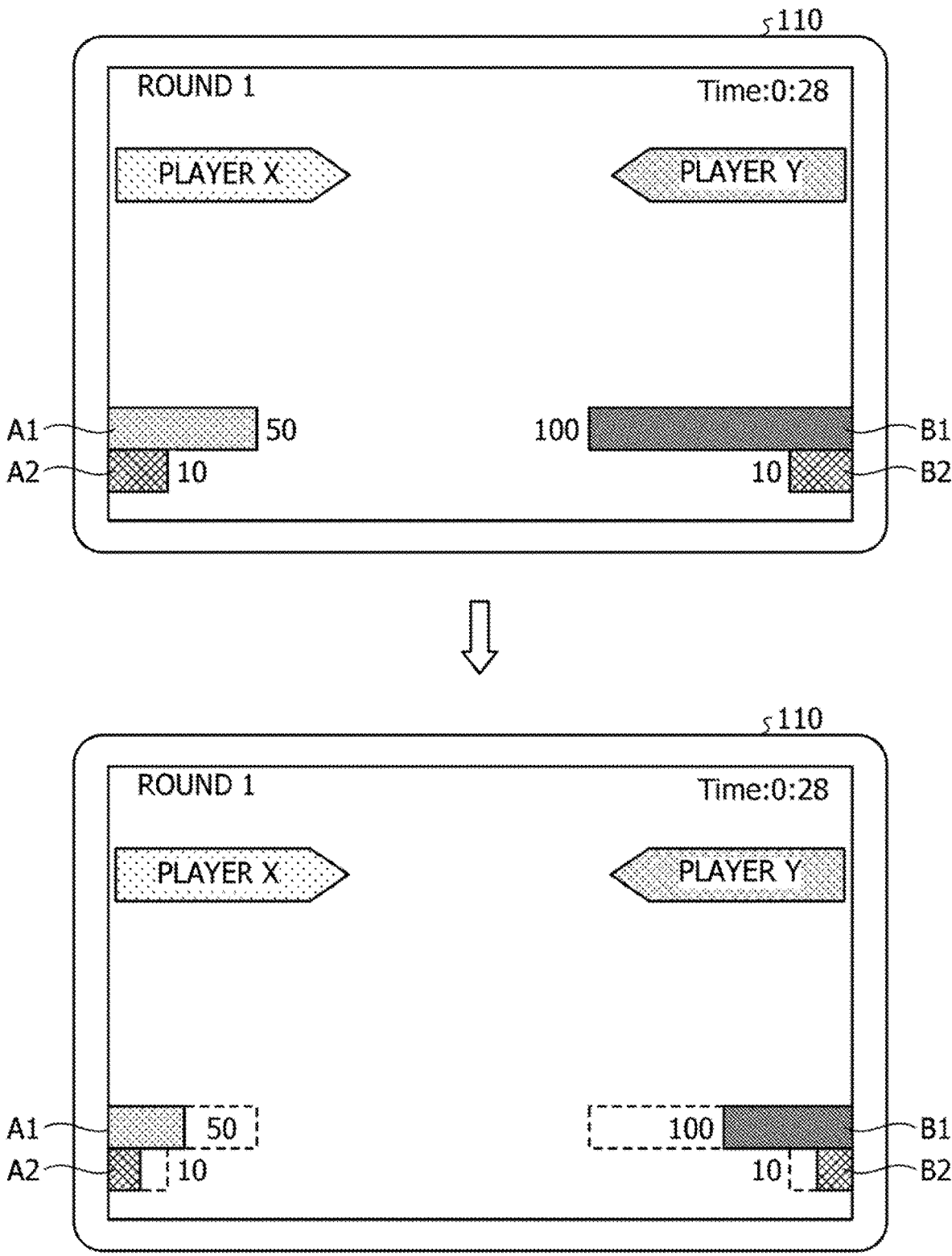
FIG. 24 is a diagram explaining another example of display reduction.

FIG. 24 is a diagram explaining another example of display reduction. As illustrated in FIG. 24, the display control unit 33c reduces the length of the display gauge B1 for the blue corner in which the count number reaches 100 as the threshold value, in half, and updates the display gauge A1 for the red corner corresponding to the normal attacks, to an image reduced in half, in accordance with the reduction of the display gauge. According to the reduction, the display control unit 33c updates the display gauge B2 for the blue corner and the display gauge A2 for the red corner, in which the count number does not reach the threshold value, to images reduced in half. The display of the count number is maintained as it is. Thereby, spectators or the like may not be confused due to a visual change.

(Display of Totalization Result)

Figure 25:
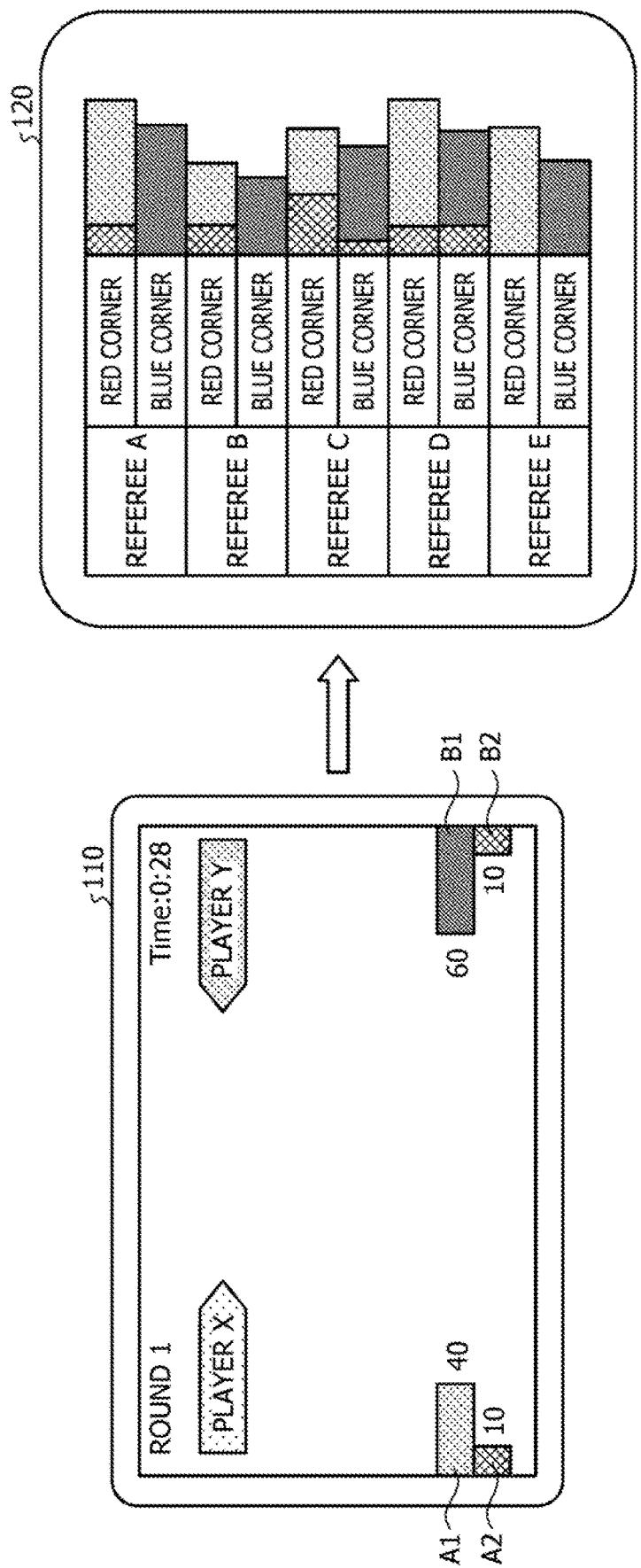
FIG. 25 is a diagram explaining a display example of a totalization result.

The display control unit 33c is able to also display a totalization result after the end of a round or after the end of a match. FIG. 25 is a diagram explaining a display example of a totalization result. As illustrated in FIG. 25, the display control unit 33c counts, for each referee, the count number of the effective attacks by referring to the collection result 25 after the end of a round or after the end of a match. The display control unit 33c generates and displays a totalization screen 120 in which the count result is displayed. At this time, the display control unit 33c matches a color of the display gauge in the totalization screen with a color of each display gauge displayed in real time.

[Flow of Processing]

Figure 26:
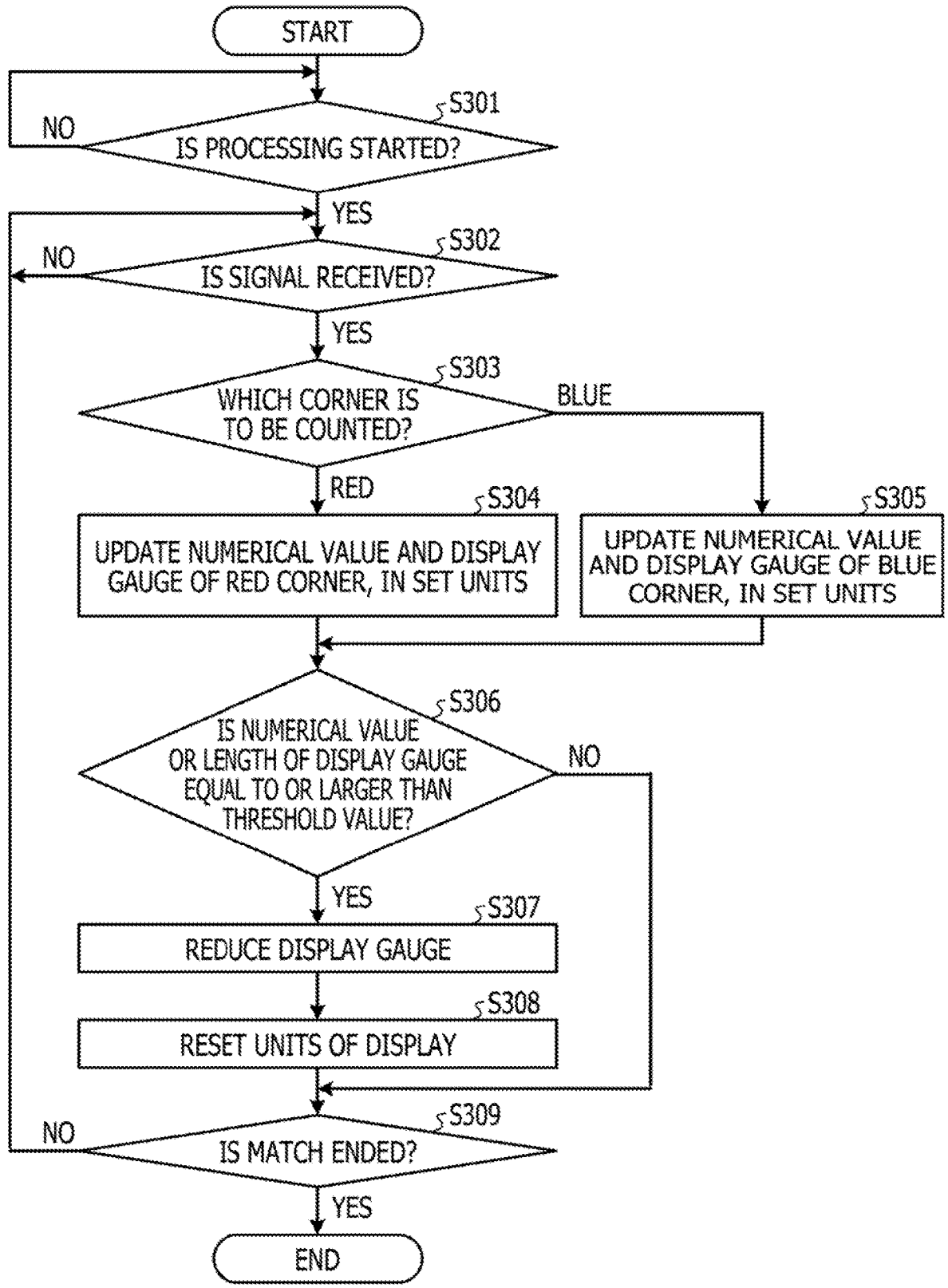
FIG. 26 is a flowchart illustrating a flow of display processing according to Embodiment 2.

FIG. 26 is a flowchart illustrating a flow of display processing according to Embodiment 2. As illustrated in FIG. 26, when processing is started (Yes in S301) and a signal is received (Yes in S302), the display control unit 33c determines which corner is to be counted based on the output conversion information 24 (S303). At this time, the display control unit 33c also specifies attack types.

In a case where the red corner is to be counted (red in S303), the display control unit 33c updates the numerical value and the display gauge of the red corner, in set units (S304). On the other hand, in a case where the blue corner is to be counted (blue in S303), the display control unit 33c updates the numerical value and the display gauge of the blue corner, in set units (S305). For example, in a case where one count corresponds to one level in the display gauge, the display control unit 33c Increases the length of the display gauge by one level, and also increases the numerical value of the display gauge by one.

Thereafter, in a case where the numerical value or the length of the display gauge becomes equal to or larger than the threshold value by the update of S304 or S305 (Yes in S306), the display control unit 33c updates the screen to a screen in which the display gauge is reduced (S307), and resets units of display (S308). For example, the display control unit 33c sets that two counts are counted to increase the length of the display gauge by one level (two counts=one level). In step S307 and step S308, step S308 may be executed first.

While the match continues (No in S309), the display control unit 33c repeatedly executes step S302 and subsequent steps. When the match ends (Yes in S309), the display control unit 33c ends the processing. In S306, in a case where the numerical value or the length of the display gauge is smaller than the threshold value (No in S306), the display control unit 33c executes step S309 without executing step S307 and step S308.

[Effects]

As described above, the monitor device 20 according to Embodiment 2 is able to display the number of times of successful attacks of each player, as a display gauge, on the left and right sides of a screen that displays a determination state of a competitive game, in real time, to spectators, viewers, or the like. When the number of times of attacks continually increases, the display gauges become too long, and as a result, there may be a problem in that the display gauges of each player extending from both ends overlap with each other. Even in this case, when the total count number of a certain player exceeds the threshold value, the monitor device 20 readjusts the display gauges by reducing the display gauges. Thereby, it is possible to correspond to gauge display of a game in which a point addition system is adopted.

Embodiment 3

While the embodiments of the present disclosure have been described, the present disclosure may be implemented in various different forms other than the embodiments described above.

[Numerical Value and Game Example]

The numerical value examples, the display examples, and threshold value examples used in the embodiments are merely examples, and may be freely changed. In the embodiments, although boxing is exemplified as an example of a competitive game, the present disclosure is not limited thereto and may be applied to a competitive game determined by a plurality of referees, such as Karate, Taekwondo, and Judo. The display of the timeline is not limited to every one second, and may be freely changed, such as every two seconds.

A method other than the method disclosed in Embodiment 2 may be adopted for reduction of the display gauge. For example, the display gauges of both players may be reduced by uniformly reducing the display gauges by a predetermined percentage, or by uniformly subtracting points (count number) by a predetermined value, or by setting the display gauge of the player having lower points to a length of zero.

[Association of Buttons]

In the above-described embodiments, although an example in which the normal attack and the strong attack are associated with each button has been described, the present disclosure is not limited thereto. For example, an attack and a defense may be associated with each button, or an attack and a domination may be associated with each button. For example, in addition to a combination of an input indicating a normal attack corresponding to the first input and an input indicating a strong attack corresponding to the second input, a combination of an input indicating an attack corresponding to the first input and an input indicating a defense corresponding to the second input may be used. The number of buttons is not limited to two for each player, and six buttons in total, three for each player, may be associated. The number of buttons and the contents associated with the buttons may be freely set and changed for each game or each referee. The display gauge may also be freely changed in accordance with the number of buttons and the contents associated with the buttons.

[Destination of Output]

For example, in Embodiment 2, although an example in which the monitor device 20 generates a screen including display gauges and outputs the screen to the large vision 110 has been described, the destination of the output may be freely changed. For example, the monitor device 20 may output the screen to the display unit 22 of the monitor device 20, the tablet terminals 200 of each referee, a smartphone of a spectator registered as a user, and the like. In a case where the screen is distributed to viewer or the like via a third party, such as television broadcasting, the monitor device 20 may transmit only information conforming to specifications of the third party, such as transmitting only information of the display gauges.

[System]

Processing procedures, control procedures, specific names, and information including various kinds of data and parameters indicated in the specification and the drawings may be freely changed unless otherwise specified. The real-time processing unit 33 corresponds to a generation unit, the count unit 32 corresponds to a storage control unit, and the request processing unit 34 corresponds to an acquisition unit and a generation unit.

The components of the devices illustrated in the drawings are functional conceptual ones, and do not necessarily have to be physically configured as illustrated in the drawings. For example, specific forms of distribution and integration of the devices are not limited to those illustrated in the drawings. For example, all or some of the devices may be functionally or physically distributed or integrated in any unit based on various loads, usage statuses, or the like. For example, the monitor device 20 may include the relay device 10.

All or any part of the processing functions performed by the devices may be implemented by a central processing unit (CPU) and a program analyzed and executed by the CPU, or may be implemented by a hardware device using wired logic coupling.

[Hardware]

Figure 27:
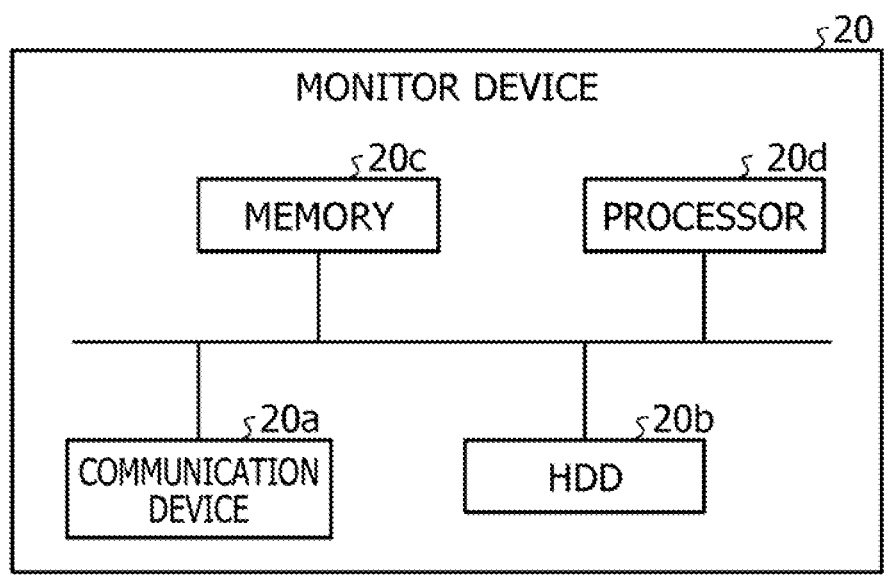
FIG. 27 is a diagram explaining an example of a hardware configuration.

Next, an example of a hardware configuration of the monitor device will be described. FIG. 27 is a diagram explaining an example of a hardware configuration. As illustrated in FIG. 27, the monitor device 20 includes a communication device 20a, a hard disk drive (HDD) 20b, a memory 20c, and a processor 20d. The components illustrated in FIG. 27 are coupled to each other by a bus or the like.

The communication device 20a is a network interface card or the like that communicates with a server. The HDD 20b stores a program and DBs for operating the functions illustrated in FIG. 2.

The processor 20d executes processes that implement the functions illustrated in FIG. 2 and FIG. 18 by reading, from the HDD 20b or the like, a program that implements processing identical to that of the processing units illustrated in FIG. 2 and loading the program into the memory 20c. For example, the processes perform the same functions as those of the processing units included in the monitor device 20. For example, the processor 20d reads, from the HDD 20b or the like, a program having the same functions as those of the acquisition unit 31, the count unit 32, the real-time processing unit 33, and the request processing unit 34. The processor 20d executes processes of executing the same processing as the processing of the acquisition unit 31, the count unit 32, the real-time processing unit 33, and the request processing unit 34.

As described above, the monitor device 20 operates as an information processing apparatus that performs an output control method by reading and executing a program. The monitor device 20 may also implement the same functions as those of the embodiments described above by reading the program from a recording medium by using a medium reading device and executing the read program. The program described in other embodiments is not limited to a program that is executed by the monitor device 20. For example, the present disclosure may be applied similarly to the case where another computer or a server executes the program or the case where the other computer and the server cooperate to execute the program.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a screen output program for causing a computer to execute a process, the process comprising:

receiving an input operation from each of a plurality of referees in a match of a competitive game;

specifying, based on the input operation, a referee who performs an input, a first input or a second input, and a plurality of players in the match;

generating a first image including middle areas and small areas, the middle areas being assigned for each player of the plurality of players, the small areas being assigned to each of the plurality of referees for each of the middle areas and being provided to be arranged along a timeline indicating a progress of the match;

adding, in the first image, an index indicating the first input or the second input to a position determined by the specified player, the specified referee, and a timing related to the input operation; and outputting a second image in which the index is added in the first image, wherein the generating process includes:

generating the screen by generating, in the small area, a scale representing at least a time width from a match start timing to a match end timing; and adding the index to be superimposed on the generated scale, wherein the generating process includes:

when both of the first input and the second input are input at a timing belonging to the same scale, generating the screen by counting the number of times of the inputs; and adding the index for the input having a priority, which is designated in advance, to be superimposed on the scale.

2. The non-transitory computer-readable recording medium according to claim 1, wherein the generating process includes generating the screen by providing the small areas in the same order through all the middle areas.

3. The non-transitory computer-readable recording medium according to claim 1, wherein the generating process includes:

when any one of the first input or the second input is input a plurality of times at a timing belonging to the same scale, generating the screen by counting the number of times of the input; and adding the index for the input of one time to be superimposed on the scale.

4. The non-transitory computer-readable recording medium according to claim 1, wherein the generating process includes generating the screen by adding, in accordance with a progress of the match, information indicating that a time is elapsed to be superimposed on the scale corresponding to the elapsed time.

5. The non-transitory computer-readable recording medium according to claim 1, wherein the first input is an input indicating a first factor that is served as a basis for a scoring result by each of the plurality of referees, and wherein the second input is an input indicating a second factor that is different from the first factor.

6. The non-transitory computer-readable recording medium according to claim 1, wherein the competitive game is a game involving an attack, wherein the first factor is a strong attack, and wherein the second factor is an attack other than the strong attack.

7. The non-transitory computer-readable recording medium according to claim 1, wherein the screen is displayed on a large vision provided in a match field or a monitor device used by a senior referee.

8. A screen output method for causing a computer to execute a process, the process comprising:
receiving an input operation from each of a plurality of referees in a match of a competitive game;
specifying, based on the input operation, a referee who performs an input, a first input or a second input, and a plurality of players in the match;
generating a first image including middle areas and small areas, the middle areas being assigned for each player of the plurality of players, the small areas being assigned to each of the plurality of referees for each of the middle areas and being provided to be arranged along a timeline indicating a progress of the match;
adding, in the first image, an index indicating the first input or the second input to a position determined by the specified player, the specified referee, and a timing related to the input operation; and
outputting a second image in which the index is added in the first image,
wherein the generating process includes:
generating the screen by generating, in the small area, a scale representing at least a time width from a match start timing to a match end timing;
adding the index to be superimposed on the generated scale;
when both of the first input and the second input are input at a timing belonging to the same scale, generating the screen by counting the number of times of the inputs; and
adding the index for the input having a priority, which is designated in advance, to be superimposed on the scale.

9. An information processing apparatus, comprising:
a memory; and
a processor coupled to the memory and configured to:
receive an input operation from each of a plurality of referees in a match of a competitive game,
specify, based on the input operation, a referee who performs an input, a first input or a second input, and a plurality of players in the match,
generate a first image including middle areas and small areas, the middle areas being assigned for each player of the plurality of players, the small areas being assigned to each of the plurality of referees for each of the middle areas and being provided to be arranged along a timeline indicating a progress of the match,
add, in the first image, an index indicating the first input or the second input to a position determined by the specified player, the specified referee, and a timing related to the input operation, and
output a second image in which the index is added in the first image,
wherein the generating process includes:
generating the screen by generating, in the small area, a scale representing at least a time width from a match start timing to a match end timing;
adding the index to be superimposed on the generated scale;
when both of the first input and the second input are input at a timing belonging to the same scale, generating the screen by counting the number of times of the inputs; and
adding the index for the input having a priority, which is designated in advance, to be superimposed on the scale.

10. A non-transitory computer-readable recording medium having stored therein a screen generation program for causing a computer to execute a process, the process comprising:
acquiring, each time a first input or a second input is received from each of a plurality of referees in a match of a competitive game, information for identifying a referee who performs the input, the first input or the second input, and one player of a plurality of players in the match;
storing, in a memory, the acquired information together with information for identifying a timing of the input; and
when a screen generation instruction is acquired, generating, for each of middle areas assigned for each player, a screen generated by providing small areas assigned to each referee in a specific order to be arranged along a timeline indicating a progress of the match, and adding an index indicating the first input or the second input at a position determined by a player and a referee specified by the acquired information and a timing according to the acquired information,
wherein the generating process includes:
generating the screen by generating, in the small area, a scale representing at least a time width from a match start timing to a match end timing;
adding the index to be superimposed on the generated scale;
when both of the first input and the second input are input at a timing belonging to the same scale, generating the screen by counting the number of times of the inputs; and
adding the index for the input having a priority, which is designated in advance, to be superimposed on the scale.

11. A screen generation method for causing a computer to execute a process, the process comprising:
acquiring, each time a first input or a second input is received from each of a plurality of referees in a match of a competitive game, information for identifying a referee who performs the input, the first input or the second input, and one player of a plurality of players in the match;
storing, in a memory, the acquired information together with information for identifying a timing of the input; and
when a screen generation instruction is acquired, generating, for each of middle areas assigned for each player, a screen generated by providing small areas assigned to each referee in a specific order to be arranged along a timeline indicating a progress of the match, and adding an index indicating the first input or the second input at a position determined by a player and a referee specified by the acquired information and a timing according to the acquired information,
wherein the generating process includes:
generating the screen by generating, in the small area, a scale representing at least a time width from a match start timing to a match end timing;
adding the index to be superimposed on the generated scale;
when both of the first input and the second input are input at a timing belonging to the same scale, generating the screen by counting the number of times of the inputs; and
adding the index for the input having a priority, which is designated in advance, to be superimposed on the scale.

12. An information processing apparatus, comprising:
a memory; and
a processor coupled to the memory and configured to:
   acquiring, each time a first input or a second input is received from each of a plurality of referees in a match of a competitive game, information for identifying a referee who performs the input, the first input or the second input, and one player of a plurality of players in the match;
   storing, in a memory, the acquired information together with information for identifying a timing of the input; and
   when a screen generation instruction is acquired, generating, for each of middle areas assigned for each player, a screen generated by providing small areas assigned to each referee in a specific order to be arranged along a timeline indicating a progress of the match, and adding an index indicating the first input or the second input at a position determined by a player and a referee specified by the acquired information and a timing according to the acquired information,
wherein the generating process includes:
generating the screen by generating, in the small area, a scale representing at least a time width from a match start timing to a match end timing;
adding the index to be superimposed on the generated scale;
when both of the first input and the second input are input at a timing belonging to the same scale, generating the screen by counting the number of times of the inputs; and
adding the index for the input having a priority, which is designated in advance, to be superimposed on the scale.

13. A monitoring system comprising:
a plurality of input devices that are used by each of a plurality of referees who determine a competitive game; and
a monitor device that is used by a senior referee who monitors the plurality of referees,
wherein each of the plurality of input devices includes receiving an input operation from each of a plurality of referees in a match of a competitive game,
wherein the monitor device includes:
   specifying, based on the input operation, a referee who performs an input, a first input or a second input, and a plurality of players in the match,
   generating a first image including middle areas and small areas, the middle areas being assigned for each player of the plurality of players, the small areas being assigned to each of the plurality of referees for each of the middle areas and being provided to be arranged along a timeline indicating a progress of the match, and
   adding, in the first image, an index indicating the first input or the second input to a position determined by the specified player, the specified referee, and a timing related to the input operation,
wherein the generating process includes:
generating the screen by generating, in the small area, a scale representing at least a time width from a match start timing to a match end timing;
adding the index to be superimposed on the generated scale;
when both of the first input and the second input are input at a timing belonging to the same scale, generating the screen by counting the number of times of the inputs; and
adding the index for the input having a priority, which is designated in advance, to be superimposed on the scale.

* * * * *